US011846861B2

(12) United States Patent
Bouchard et al.

(10) Patent No.: US 11,846,861 B2
(45) Date of Patent: Dec. 19, 2023

(54) COLOR SETS FOR LOW RESOLUTION DITHERING IN REFLECTIVE COLOR DISPLAYS COLOR SETS FOR LOW RESOLUTION DITHERING IN REFLECTIVE COLOR DISPLAYS

(71) Applicant: E Ink Corporation, Billerica, MA (US)

(72) Inventors: Alain Bouchard, Boston, MA (US); Stephen J. Telfer, Arlington, MA (US)

(73) Assignee: E Ink Corporation, Billerica, MA (US)

(*) Notice: Subject to any disclaimer, the term of this patent is extended or adjusted under 35 U.S.C. 154(b) by 148 days.

(21) Appl. No.: 17/408,837

(22) Filed: Aug. 23, 2021

(65) Prior Publication Data

US 2021/0382368 A1    Dec. 9, 2021

Related U.S. Application Data

(62) Division of application No. 16/430,930, filed on Jun. 4, 2019, now Pat. No. 11,402,718, which is a division
(Continued)

(51) Int. Cl.
*G02F 1/167* (2019.01)
*G09G 3/34* (2006.01)
(Continued)

(52) U.S. Cl.
CPC ............ *G02F 1/167* (2013.01); *G09G 3/2044* (2013.01); *G09G 3/344* (2013.01);
(Continued)

(58) Field of Classification Search
CPC ............ G02F 1/167; G02F 2001/1678; G02F 1/1679; G02F 1/1685; G02F 1/16757;
(Continued)

(56) References Cited

U.S. PATENT DOCUMENTS 4,418,346 A    11/1983   Batchelder
4,956,638 A     9/1990   Larky et al.
(Continued)

FOREIGN PATENT DOCUMENTS

KR    20100120022 A    11/2010
KR    20120038702 A     4/2012

OTHER PUBLICATIONS

Wood, D., "An Electrochromic Renaissance?" Information Display, 18(3), 24 (Mar. 2002).
(Continued)

*Primary Examiner* — Brandi N Thomas
(74) *Attorney, Agent, or Firm* — Brian D. Bean

(57) ABSTRACT

The present invention provides for a method of rendering an image on a reflective display wherein each pixel is capable of rendering a limited number of colors, each of which is rendered by predetermined set of waveforms stored in a waveform lookup table. Furthermore, the present invention provides for a method for rendering an image using such colors, having been chosen for optimal color rendition. This invention further provides for rendering a color image formed from a plurality of pixels on a reflective display wherein each pixel has a color selected from the group consisting of at least: red, green, blue, cyan, magenta, yellow, black and white.

5 Claims, 17 Drawing Sheets

Related U.S. Application Data of application No. 14/866,322, filed on Sep. 25, 2015, now Pat. No. 10,353,266.

(60) Provisional application No. 62/056,302, filed on Sep. 26, 2014.

(51) Int. Cl.
*G09G 3/20* (2006.01)
*G02F 1/1675* (2019.01)

(52) U.S. Cl.
CPC .. *G02F 2001/1678* (2013.01); *G02F 2201/52* (2013.01); *G09G 3/2003* (2013.01); *G09G 2310/08* (2013.01); *G09G 2340/06* (2013.01)

(58) Field of Classification Search
CPC .. G02F 1/1677; G02F 1/1681; G02F 2201/52; G02F 1/133514; G02F 2202/28; G02F 1/133516; G02F 1/1334; G02F 1/133348; G02F 1/133354; G02F 1/134363; G02F 2203/34; G02F 1/172; G02F 1/133305; G02F 1/1347; G02F 1/1676; G02F 2201/12; G02F 1/1339; G02F 1/137; G02F 1/16762; G02F 2201/123; G02F 1/0018; G02F 1/0107; G02F 1/13306; G02F 1/133308; G02F 1/133553; G02F 1/134309; G02F 1/1675; G02F 1/16766; G02F 1/23; G02F 2201/44; G02F 2201/503; G02F 2202/022; G02F 2202/04; G02F 2203/09; G02F 2203/10; G02F 2203/15; G02F 1/0009; G02F 1/0027; G02F 1/0102; G02F 1/1309; G02F 1/133377; G02F 1/13338; G02F 1/133528; G02F 1/133562; G02F 1/133615; G02F 1/13363; G02F 1/133707; G02F 1/1341; G02F 1/1343; G02F 1/13439; G02F 1/136213; G02F 1/136254; G02F 1/1368; G02F 1/13737; G02F 1/1508; G02F 1/153; G02F 1/155; G02F 1/157; G02F 1/16753; G02F 1/16761; G02F 1/17; G02F 1/195; G02F 2001/1502; G02F 2001/1536; G02F 2001/1635; G02F 2201/38; G02F 2201/501; G02F 2202/023; G02F 2203/01; G02F 2203/30; G09G 3/344; G09G 3/2003; G09G 2310/068; G09G 2310/06; G09G 2300/0452; G09G 3/3446; G09G 2310/08; G09G 2300/0426; G09G 2300/08; G09G 2310/061; G09G 2320/0204; G09G 2300/0809; G09G 2320/0223; G09G 3/3225; G09G 3/3266; G09G 3/3275; G09G 3/3406; G09G 2310/0256; G09G 2320/0666; G09G 2340/06; G09G 3/2044; G09G 2230/00; G09G 2300/0842; G09G 2310/063; G09G 2310/065; G09G 2320/0219; G09G 2320/0242; G09G 2330/021; G09G 2330/028; G09G 3/2074; G09G 3/3433; G09G 2300/023; G09G 2300/0439; G09G 2310/0245; G09G 2310/0264; G09G 2310/0267; G09G 2310/0275; G09G 2310/04; G09G 2310/067; G09G 2320/0209; G09G 2320/0238; G09G 2320/0252; G09G 2320/0257; G09G 2320/066; G09G 2320/068; G09G 2320/0693; G09G 2360/14; G09G 3/20; G09G 3/30; G09G 3/34; G09G 3/3611
See application file for complete search history.

(56) References Cited

U.S. PATENT DOCUMENTS

| | | | |
|---|---|---|---|
| 5,649,083 | A | 7/1997 | Barkans et al. |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |
| 5,880,857 | A | 3/1999 | Shiau et al. |
| 5,930,026 | A | 7/1999 | Jacobson et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,081,249 | A | 6/2000 | Harris |
| 6,097,531 | A | 8/2000 | Sheridon |
| 6,128,124 | A | 10/2000 | Silverman |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |
| 6,271,823 | B1 | 8/2001 | Gordon, II et al. |
| 6,301,038 | B1 | 10/2001 | Fitzmaurice et al. |
| 6,445,489 | B1 | 9/2002 | Jacobson et al. |
| 6,504,524 | B1 | 1/2003 | Gates et al. |
| 6,512,354 | B2 | 1/2003 | Jacobson et al. |
| 6,531,997 | B1 | 3/2003 | Gates et al. |
| 6,664,944 | B1 | 12/2003 | Albert et al. |
| 6,672,921 | B1 | 1/2004 | Liang et al. |
| 6,727,873 | B2 | 4/2004 | Gordon, II et al. |
| 6,753,999 | B2 | 6/2004 | Zehner et al. |
| 6,788,449 | B2 | 9/2004 | Liang et al. |
| 6,825,970 | B2 | 11/2004 | Goenaga et al. |
| 6,842,657 | B1 | 1/2005 | Drzaic et al. |
| 6,866,760 | B2 | 3/2005 | Paolini, Jr. et al. |
| 6,900,851 | B2 | 5/2005 | Morrison et al. |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,023,420 | B2 | 4/2006 | Comiskey et al. |
| 7,034,783 | B2 | 4/2006 | Gates et al. |
| 7,075,502 | B1 | 7/2006 | Drzaic et al. |
| 7,113,323 | B2 | 9/2006 | Ho et al. |
| 7,116,318 | B2 | 10/2006 | Amundson et al. |
| 7,116,466 | B2 | 10/2006 | Whitesides et al. |
| 7,119,772 | B2 | 10/2006 | Amundson et al. |
| 7,167,155 | B1 | 1/2007 | Albert et al. |
| 7,193,625 | B2 | 3/2007 | Danner et al. |
| 7,202,847 | B2 | 4/2007 | Gates |
| 7,236,291 | B2 | 6/2007 | Kaga et al. |
| 7,259,744 | B2 | 8/2007 | Arango et al. |
| 7,312,784 | B2 | 12/2007 | Baucom et al. |
| 7,321,459 | B2 | 1/2008 | Masuda et al. |
| 7,327,511 | B2 | 2/2008 | Whitesides et al. |
| 7,339,715 | B2 | 3/2008 | Webber et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,492,339 | B2 | 2/2009 | Amundson |
| 7,499,211 | B2 | 3/2009 | Suwabe et al. |
| 7,528,822 | B2 | 5/2009 | Amundson et al. |
| 7,535,624 | B2 | 5/2009 | Amundson et al. |
| 7,561,324 | B2 | 7/2009 | Duthaler et al. |
| 7,583,251 | B2 | 9/2009 | Arango et al. |
| 7,602,374 | B2 | 10/2009 | Zehner et al. |
| 7,612,760 | B2 | 11/2009 | Kawai |
| 7,667,684 | B2 | 2/2010 | Jacobson et al. |
| 7,679,599 | B2 | 3/2010 | Kawai |
| 7,679,814 | B2 | 3/2010 | Paolini, Jr. et al. |

(56) References Cited

U.S. PATENT DOCUMENTS

| | | |
|---|---|---|
| 7,733,335 B2 | 6/2010 | Zehner et al. |
| 7,839,564 B2 | 11/2010 | Whitesides et al. |
| 7,848,009 B2 | 12/2010 | Machida et al. |
| 7,885,457 B2 | 2/2011 | Hirano et al. |
| 7,910,175 B2 | 3/2011 | Webber |
| 7,952,557 B2 | 5/2011 | Amundson |
| 7,952,790 B2 | 5/2011 | Honeyman |
| 7,999,787 B2 | 8/2011 | Amundson et al. |
| 8,009,348 B2 | 8/2011 | Zehner et al. |
| 8,023,176 B2 | 9/2011 | Akashi et al. |
| 8,031,392 B2 | 10/2011 | Hiji et al. |
| 8,040,594 B2 | 10/2011 | Paolini, Jr. et al. |
| 8,054,288 B2 | 11/2011 | Sugita et al. |
| 8,054,526 B2 | 11/2011 | Bouchard |
| 8,077,141 B2 | 12/2011 | Duthaler et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,174,491 B2 | 5/2012 | Machida et al. |
| 8,211,221 B2 | 7/2012 | Tanaka et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,319,759 B2 | 11/2012 | Jacobson et al. |
| 8,363,299 B2 | 1/2013 | Paolini, Jr. et al. |
| 8,384,658 B2 | 2/2013 | Albert et al. |
| 8,547,394 B2 | 10/2013 | Swic et al. |
| 8,558,783 B2 | 10/2013 | Wilcox et al. |
| 8,565,522 B2 | 10/2013 | Swic |
| 8,576,470 B2 | 11/2013 | Paolini, Jr. et al. |
| 8,576,476 B2 | 11/2013 | Telfer et al. |
| 8,587,859 B2 | 11/2013 | Kayashima et al. |
| 8,704,754 B2 | 4/2014 | Machida et al. |
| 8,717,664 B2 | 5/2014 | Wang et al. |
| 8,730,216 B2 | 5/2014 | Mizutani et al. |
| 8,797,634 B2 | 8/2014 | Paolini, Jr. et al. |
| 8,873,129 B2 | 10/2014 | Paolini, Jr. et al. |
| 8,902,153 B2 | 12/2014 | Bouchard et al. |
| 8,917,439 B2 | 12/2014 | Wang et al. |
| 8,928,562 B2 | 1/2015 | Gates et al. |
| 8,964,282 B2 | 2/2015 | Wang et al. |
| 9,013,516 B2 | 4/2015 | Sakamoto et al. |
| 9,116,412 B2 | 8/2015 | Lin |
| 9,152,005 B2 | 10/2015 | Morikawa et al. |
| 9,199,441 B2 | 12/2015 | Danner |
| 9,230,492 B2 | 1/2016 | Harrington et al. |
| 9,348,193 B2 | 5/2016 | Hiji et al. |
| 9,412,314 B2 | 8/2016 | Amundson et al. |
| 9,672,766 B2 | 6/2017 | Sjodin |
| 9,697,778 B2 | 7/2017 | Telfer et al. |
| 10,031,394 B2 | 7/2018 | Nakayama et al. |
| 10,319,313 B2 | 6/2019 | Harris et al. |
| 10,372,008 B2 | 8/2019 | Telfer et al. |
| 2003/0102858 A1 | 6/2003 | Jacobson et al. |
| 2005/0253777 A1 | 11/2005 | Zehner et al. |
| 2007/0103427 A1 | 5/2007 | Zhou et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0062159 A1 | 3/2008 | Roh et al. |
| 2008/0291526 A1* | 11/2008 | Lin .................... G02F 1/16757 359/296 |
| 2010/0060628 A1 | 3/2010 | Lenssen et al. |
| 2010/0265561 A1 | 10/2010 | Gates et al. |
| 2011/0175939 A1 | 7/2011 | Moriyama et al. |
| 2011/0285713 A1 | 11/2011 | Swic et al. |
| 2013/0208346 A1 | 8/2013 | Inoue et al. |
| 2013/0222884 A1 | 8/2013 | Moriyama et al. |
| 2013/0222886 A1 | 8/2013 | Kawahara et al. |
| 2013/0278993 A1 | 10/2013 | Heikenfeld et al. |
| 2015/0160527 A1 | 6/2015 | Joo et al. |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Heikenfeld, J. et al., "A critical review of the present and future prospects for electronic paper", SID, 19(2), pp. 129-156 (2011).

Korean Intellectual Property Office; PCT/US2015/052391; International Search Report and Written Opinion; dated Feb. 1, 2016.

European Patent Office, EP Appl. No. 15845087.4, Exteded European Search Report, dated Mar. 12, 2018.

\* cited by examiner

|  | White | Yellow | White | Magenta | White | Cyan | White | Yellow | White |
|---|---|---|---|---|---|---|---|---|---|
| Cyan | | Cyan | | Magenta | | Yellow | | Cyan | |
| Magenta | | Magenta | | | | Magenta | | Magenta | |
| Yellow | | | | | | Yellow | | Yellow | |

White   Yellow   Red   Magenta   Blue   Cyan   Green   Black
[A]     [B]      [C]   [D]       [E]    [F]    [G]     [H]

Fig. 1

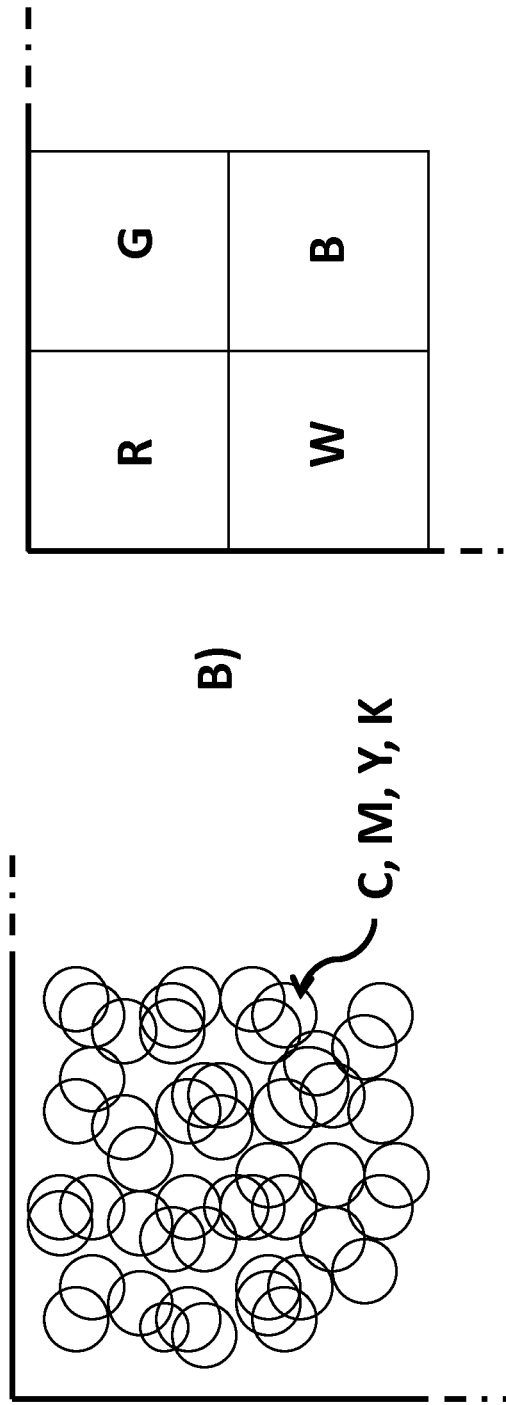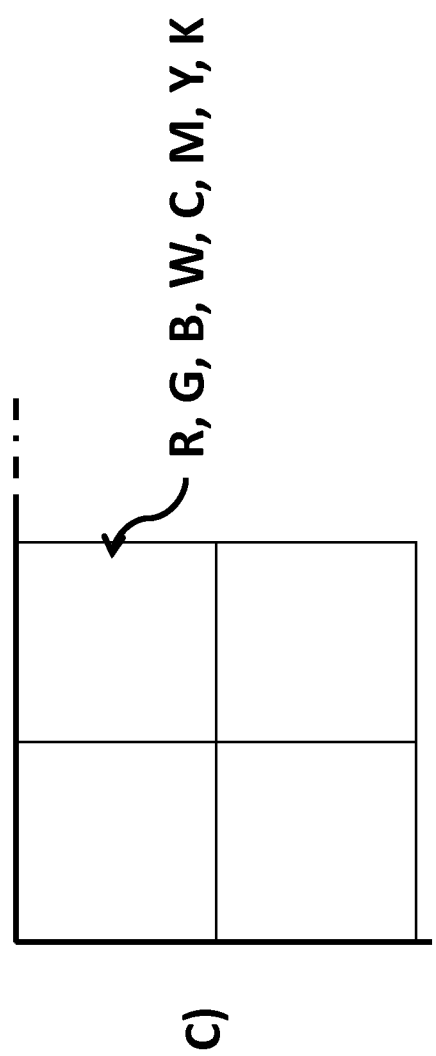
Figs. 7A, 7B & 7C

COLOR SETS FOR LOW RESOLUTION DITHERING IN REFLECTIVE COLOR DISPLAYS COLOR SETS FOR LOW RESOLUTION DITHERING IN REFLECTIVE COLOR DISPLAYS

This application is a divisional of co-pending U.S. patent application Ser. No. 16/430,930 filed Jun. 4, 2019, which is a divisional of U.S. patent application Ser. No. 14/866,322, filed Sep. 25, 2015 now issued as U.S. Pat. No. 10,353,266, which claims benefit of U.S. Provisional Application Ser. No. 62/056,302, filed Sep. 26, 2014.

This application is related to U.S. application Ser. No. 14/849,658, filed Sep. 10, 2015, now issued U.S. Pat. No. 9,921,451. The entire contents of this application and of all U.S. patents and published and copending applications mentioned below are herein incorporated by reference.

BACKGROUND OF INVENTION

The present invention provides for a method for rendering a colored image on a reflective display, wherein at each pixel location it is possible to render one of a predetermined palette of colors.

The term color as used herein includes black and white. White particles are often of the light scattering type.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
  (b) Capsules, binders and encapsulation processes; see for example U.S. Pat. Nos. 6,922,276 and 7,411,719;
  (c) Films and sub-assemblies containing electro-optic materials; see for example U.S. Pat. Nos. 6,982,178 and 7,839,564;
  (d) Backplanes, adhesive layers and other auxiliary layers and methods used in displays; see for example U.S. Pat. Nos. 7,116,318 and 7,535,624;
  (e) Color formation and color adjustment; see for example U.S. Pat. Nos. 6,017,584; 6,664,944; 6,864,875; 7,075, 502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; and 8,314,784; and U.S. Patent Applications Publication Nos. 2003/0102858; 2005/0122284; 2005/0179642; 2005/0253777; 2007/0091418; 2007/0103427; 2008/0024429; 2008/0024482; 2008/0136774; 2008/0150888; 2008/0291129; 2009/0174651; 2009/0179923; 2009/0195568; 2009/0322721; 2010/0045592; 2010/0220121; 2010/0220122; 2010/0265561; 2011/0187684; 2011/0193840; 2011/0193841; 2011/0199671; and 2011/0285754 (these patents and applications may hereinafter be referred to as the MEDEOD (MEthods for Driving Electro-optic Displays) applications);

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The aforementioned U.S. Pat. No. 6,982,178 describes a method of assembling a solid electro-optic display (including an encapsulated electrophoretic display) which is well adapted for mass production. Essentially, this patent describes a so-called front plane laminate (FPL) which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called double release sheet which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called inverted front plane laminate, which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

Multilayer, stacked electrophoretic displays are known in the art; J. Heikenfeld, P. Drzaic, J-S Yeo and T. Koch, Journal of the SID, 19(2), 2011, pp. 129-156. In such displays, ambient light passes through images in each of the three subtractive primary colors, in precise analogy with conventional color printing. U.S. Pat. No. 6,727,873 describes a stacked electrophoretic display in which three layers of switchable cells are placed over a reflective background. Similar displays are known in which colored particles are moved laterally (see International Application No. WO 2008/065605) or, using a combination of vertical and lateral motion, sequestered into micropits. In both cases, each layer is provided with electrodes that serve to concentrate or disperse the colored particles on a pixel-by-pixel basis, so that each of the three layers requires a layer of thin-film transistors (TFT's) (two of the three layers of TFT's must be substantially transparent) and a light-transmissive counter-electrode. Such a complex arrangement of electrodes is costly to manufacture, and in the present state of the art it is difficult to provide an adequately transparent plane of pixel electrodes, especially as the white state of the display must be viewed through several layers of electrodes. Multi-layer displays also suffer from parallax problems as the thickness of the display stack approaches or exceeds the pixel size.

U.S. Applications Publication Nos. 2012/0008188 and 2012/0134009 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Patent Application Publication No. 2013/0208338 describes a color display comprising an electrophoretic fluid which comprises one or two types of pigment particles dispersed in a clear and colorless or colored solvent, the electrophoretic fluid being sandwiched between a common electrode and a plurality of driving electrodes. The driving electrodes are kept at a certain distance in order to expose a background layer. U.S. Patent Application Publication No. 2014/0177031 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage which is about 1 to about 20% of the full driving voltage. U.S. Patent Application Publication No. 2014/0092465 and 2014/0092466 describe an electrophoretic fluid, and a method for driving an electrophoretic display. The fluid comprises first, second and thirds type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below.

U.S. Patent Application Publication No. 2007/0031031 describes an image processing device for processing image data in order to display an image on a display medium in which each pixel is capable of displaying white, black and one other color. U.S. Patent Applications Publication Nos. 2008/0151355; 2010/0188732; and 2011/0279885 describe a color display in which mobile particles move through a porous structure. U.S. Patent Applications Publication Nos. 2008/0303779 and 2010/0020384 describe a display medium comprising first, second and third particles of differing colors. The first and second particles can form aggregates, and the smaller third particles can move through apertures left between the aggregated first and second particles. U.S. Patent Application Publication No. 2011/0134506 describes a display device including an electrophoretic display element including plural types of particles enclosed between a pair of substrates, at least one of the substrates being translucent and each of the respective plural types of particles being charged with the same polarity, differing in optical properties, and differing in either in migration speed and/or electric field threshold value for moving, a translucent display-side electrode provided at the substrate side where the translucent substrate is disposed, a first back-side electrode provided at the side of the other substrate, facing the display-side electrode, and a second back-side electrode provided at the side of the other substrate, facing the display-side electrode; and a voltage control section that controls the voltages applied to the display-side electrode, the first back-side electrode, and the second back-side electrode, such that the types of particles having the fastest migration speed from the plural types of particles, or the types of particles having the lowest threshold value from the plural types of particles, are moved, in sequence by each of the different types of particles, to the first back-side electrode or to the second back-side electrode, and then the particles that moved to the first back-side electrode are moved to the display-side electrode. U.S. Patent Applications Publication Nos. 2011/0175939; 2011/0298835; 2012/0327504; and 2012/0139966 describe color displays which rely upon aggregation of multiple particles and threshold voltages. U.S. Patent Application Publication No. 2013/0222884 describes an electrophoretic particle, which contains a colored particle containing a charged group-containing polymer and a coloring agent, and a branched silicone-based polymer being attached to the colored particle and containing, as copolymerization components, a reactive monomer and at least one monomer selected from a specific group of monomers. U.S. Patent Application Publication No. 2013/0222885 describes a dispersion liquid for an electrophoretic display containing a dispersion medium, a colored electrophoretic particle group dispersed in the dispersion medium and migrates in an electric field, a non-electrophoretic particle group which does not migrate and has a color different from that of the electrophoretic particle group, and a compound having a neutral polar group and a hydrophobic group, which is contained in the dispersion medium in a ratio of about 0.01 to about 1 mass % based on the entire dispersion liquid. U.S. Patent Application Publication No. 2013/0222886 describes a dispersion liquid for a display including floating particles containing: core particles including a colorant and a hydrophilic resin; and a shell covering a surface of each of the core particles and containing a hydrophobic resin with a difference in a solubility parameter of 7.95 $(J/cm^3)^{1/2}$ or more. U.S. Patent Applications Publication Nos. 2013/0222887 and 2013/0222888 describe an electrophoretic particle having specified chemical compositions. Finally, U.S. Patent Application Publication No. 2014/0104675 describes a particle dispersion including first and second colored particles that move in response to an electric field, and a dispersion medium, the second colored particles having a larger diameter than the first colored particles and the same charging characteristic as a charging characteristic of the first color particles, and in which the ratio (Cs/Cl) of the charge amount Cs of the first colored particles to the charge amount Cl of the second colored particles per unit area of the display is less than or equal to 5. Some of the aforementioned displays do provide full color but at the cost of requiring addressing methods that are long and cumbersome.

U.S. Patent Applications Publication Nos. describe an electrophoresis device including a plurality of first and second electrophoretic particles included in an insulating liquid, the first and second particles having different charging characteristics that are different from each other; the device further comprising a porous layer included in the insulating liquid and formed of a fibrous structure. These patent applications are not full color displays in the sense in which that term is used below.

See also U.S. Patent Application Publication No. 2011/0134506 and the aforementioned application Ser. No. 14/277,107; the latter describes a full color display using three different types of particles in a colored fluid, but the presence of the colored fluid limits the quality of the white state which can be achieved by the display.

In summary, in the current state of the art, there exist several embodiments of color reflective displays that differ in their mechanism of producing color. Although such displays are typically capable of rendering multiple colors at every pixel location (for example, black, white, the three subtractive primary colors (cyan, magenta and yellow) and the three additive primary colors (red, green and blue), in the current state of the art they are not capable of rendering colors corresponding to 256 RGB levels at every pixel location. This is in contrast to a typical emissive display (such as a liquid crystal display or a display made using light-emitting diodes) that is capable of providing at least 256 different intensity levels in red, green and blue channels, for a total of $2^{24}$ different colors, at each pixel location.

The present invention seeks to provide a method for rendering a full-color image on a reflective display capable of providing a palette of colors at each pixel location that comprises fewer colors than are required to render an image on the display as a whole (i.e., the colors available at the pixel level are quantized at a coarser level than those required to render an image of sufficient quality for a particular application). The method of the invention involves dithering between colors that are available in each pixel's color palette, in such a way that the spatial resolution of the image rendered on the display is reduced but the color depth increased. Such dithering is well-known in the printing art. When a dithered image is viewed at a sufficient distance, the individual colored pixels are merged by the human visual system into perceived uniform colors. Because of the trade-off between color depth and spatial resolution, dithered images when viewed closely have a characteristic graininess as compared to images in which the color palette available at each pixel location has the same depth as that required to render images on the display as a whole.

Algorithms for assigning particular colors to particular pixels have been developed in order to avoid unpleasant patterns and textures in images rendered by dithering. Such algorithms may involve error diffusion, a technique in which error resulting from the difference between the color required at a certain pixel and the closest color in the per-pixel palette (i.e., the quantization residual) is distributed to neighboring pixels that have not yet been processed. European Patent No. 0677950 describes such techniques in detail, while U.S. Pat. No. 5,880,857 describes a metric for comparison of dithering techniques.

In the present invention, a method for selecting which colors should optimally be selected for the (reduced) color palette available at each pixel location in a reflective display is presented.

SUMMARY OF INVENTION

The present invention provides for a method of rendering an image on a reflective display in which three different color sets are involved. A first color set contains a particular number of colors, each of which is rendered by one of a predetermined set of waveforms stored in a waveform lookup table. A second color set is defined by the image to be rendered on the display (typically, comprising $2^{24}$ different colors), and a third color set is defined by the colors capable of being rendered by the display using any possible waveform. The first color set is smaller than the second and third color sets and the first color set is a subset of the third color set. Furthermore, the present invention provides for a method for rendering an image by assigning, from the third color set, those colors that are to form the first color set, those colors being chosen for optimal color rendition.

Further, this invention provides for an image formed from a plurality of pixels on a reflective display wherein each pixel has a color selected from the group consisting of: red, green, blue, cyan, magenta, yellow, black and white.

Further, this invention provides for an image formed from a plurality of pixels on a reflective display wherein each pixel has a color selected from the group consisting of: red, green, blue, cyan, magenta, yellow, black, white, light red, light green, light blue, dark cyan, dark magenta, dark yellow, light gray and dark gray.

Yet further, this invention provides for an image formed on a reflective display, wherein each pixel has a color selected from the group consisting of: red, green, blue, cyan, magenta, yellow, black, white, orange, pink, green, violet, cyan lime and pure blue Still further, this invention provides for an image formed on a reflective display, wherein each pixel has a color selected from the group consisting of light, intermediate, and dark versions of: red, green, blue, cyan, magenta, yellow, black and white.

BRIEF DESCRIPTION OF DRAWINGS

FIG. 1 of the accompanying drawings is a schematic cross-section showing the positions of the various particles in an electrophoretic medium of the present invention when displaying black, white, the three subtractive primary and the three additive primary colors.

FIGS. 7A, 7B and 7C of the accompanying drawings show three general methods of rendering color on reflective media.

DETAILED DESCRIPTION

Figure 2A:
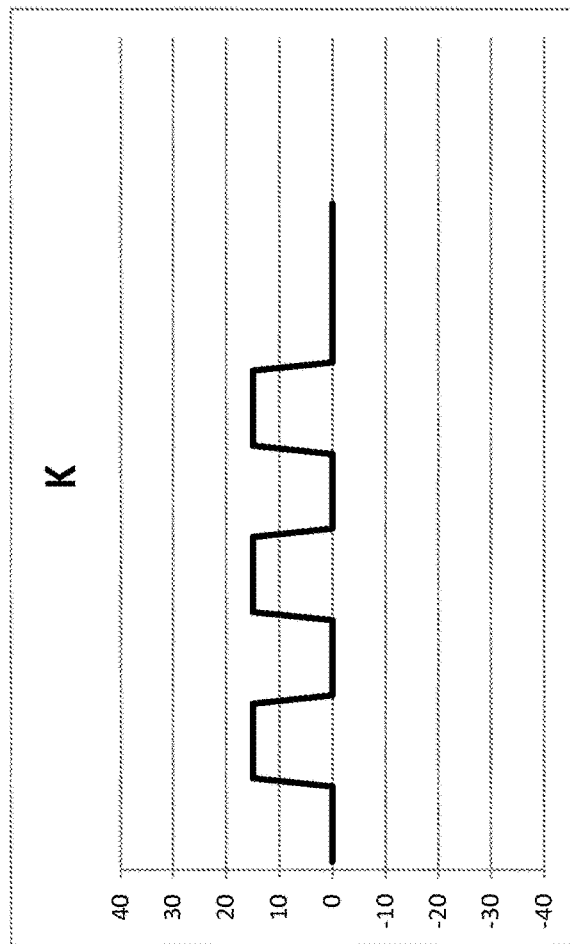
FIGS. 2A and 2B show waveforms used to drive the electrophoretic medium shown in FIG. 1 to its black and white states respectively.

One type of reflective display is an electrophoretic display containing an electrophoretic medium. An electrophoretic medium comprises a fluid, a first, light scattering particle (typically white) and second, third and fourth particles having three subtractive primary colors (typically magenta, cyan and yellow); at least two of these colored particles being non-light scattering. The first and second particles bear polymer coatings such that the electric field required to separate an aggregate formed by the third and the fourth particles is greater than that required to separate an aggregate formed from any other two types of particles. Methods for driving the medium to produce white ("W"), black ("K"), magenta ("M"), cyan ("C"), yellow ("Y"), red ("R"), green ("G") and blue ("B") colors are also described.

FIG. 1 of the accompanying drawings is a schematic cross-section showing the positions of the various particles in an electrophoretic medium of the present invention when displaying black, white, the three subtractive primary and the three additive primary colors. In FIG. 1, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 1 this particle is assumed to be the white pigment. Basically, this light-scattering white particle forms a white reflector against which any particles above the white particles (as illustrated in FIG. 1) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 1), there are no particles above the white particles and the pixel simply displays a white color. When a single particle is above the white particles, the color of that single particle is displayed, yellow, magenta and cyan in Situations [B], [D] and [F] respectively in FIG. 1. When two particles lie above the white particles, the color displayed is a combination of those of these two particles; in FIG. 1, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 1), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

It would not be easy to render the color black if more than one type of colored particle scattered light.

FIG. 1 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. A display device may be constructed using an electrophoretic fluid of the invention in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive.

A first embodiment of waveforms used to achieve each of the particle arrangements shown in FIG. 1 will now be described with reference to FIGS. 2-4. Hereinafter this method of driving will be referred to as the "first drive scheme" of the invention. In this discussion it is assumed that a first set of particles are white and negatively charged, a second set of particles are cyan and positively charged, a third set of particles are yellow and negatively charged, and a fourth set of particles are magenta and positively charged. Those skilled in the art will understand how the color transitions will change if these assignments of particle colors are changed. Similarly, the polarities of the charges on all the particles can be inverted and the electrophoretic medium will still function in the same manner provided that the polarity of the waveforms (see next paragraph) used to drive the medium is similarly inverted.

In the discussion that follows, the waveform (voltage against time curve) applied to the pixel electrode of the backplane of a display of the invention is described and plotted, while the front electrode is assumed to be grounded (i.e., at zero potential). The electric field experienced by the electrophoretic medium is of course determined by the difference in potential between the backplane and the front electrode and the distance separating them. The display is typically viewed through its front electrode, so that it is the particles adjacent the front electrode which control the color displayed by the pixel, and if it is sometimes easier to understand the optical transitions involved if the potential of the front electrode relative to the backplane is considered; this can be done simply by inverting the waveforms discussed below.

These waveforms require that each pixel of the display can be driven at five different addressing voltages, designated $+V_{high}$, $+V_{low}$, 0, $-V_{low}$ and $-V_{high}$, illustrated as 30V, 15V, 0, −15V and −30V in FIGS. 2-4. In practice it may be preferred to use a larger number of addressing voltages. If only three voltages are available (i.e., $+V_{high}$, 0, and $-V_{high}$) it may be possible to achieve the same result as addressing at a lower voltage (say, $V_{high}/n$ where n is a positive integer>1) by addressing with pulses of voltage $V_{high}$ but with a duty cycle of 1/n.

Waveforms used in the present invention may comprise three phases: a DC-balancing phase, in which a DC imbalance due to previous waveforms applied to the pixel is corrected, or in which the DC imbalance to be incurred in the subsequent color rendering transition is corrected (as is known in the art), a "reset" phase, in which the pixel is returned to a starting configuration that is at least approximately the same regardless of the previous optical state of the pixel, and a "color rendering" phase as described below. The DC-balancing and reset phases are optional and may be omitted, depending upon the demands of the particular application. The "reset" phase, if employed, may be the same as the magenta color rendering waveform described below, or may involve driving the maximum possible positive and negative voltages in succession, or may be some other pulse pattern, provided that it returns the display to a state from which the subsequent colors may reproducibly be obtained.

Figure 2B:
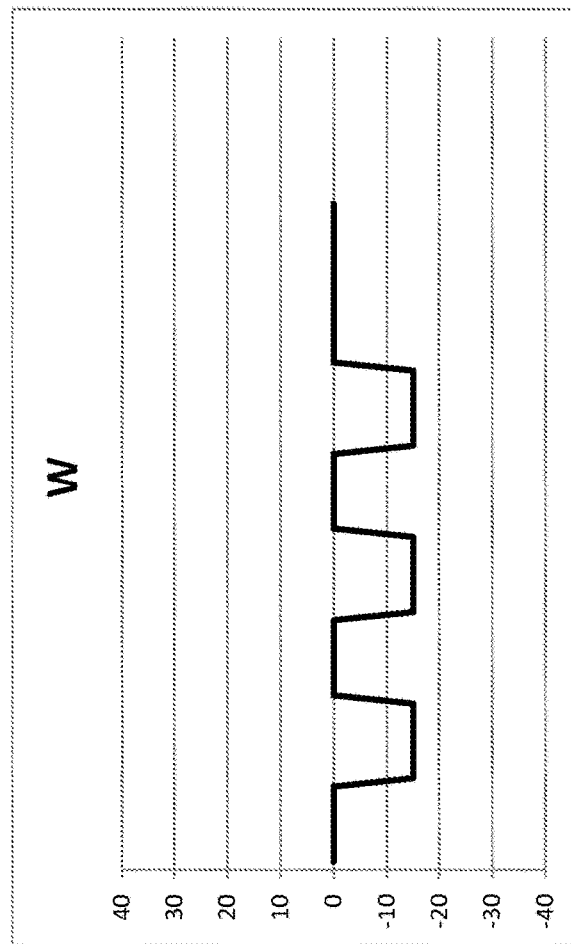

FIGS. 2A and 2B show, in idealized form, typical color rendering phases of waveforms used to produce the black and white states in displays of the present invention. The graphs in FIGS. 2A and 2B show the voltage applied to the backplane (pixel) electrodes of the display while the transparent, common electrode on the top plane is grounded. The x-axis represents time, measured in arbitrary units, while the y-axis is the applied voltage in Volts. Driving the display to black (FIG. 2A) or white (FIG. 2B) states is effected by a sequence of positive or negative impulses, respectively, preferably at voltage $V_{low}$ because, as noted above, at the fields (or currents) corresponding to $V_{low}$ the magenta and yellow pigments are aggregated together. Thus, the white and cyan pigments move while the magenta and yellow pigments remain stationary (or move with a much lower velocity) and the display switches between a white state and a state corresponding to absorption by cyan, magenta and yellow pigments (often referred to in the art as a "composite black"). The length of the pulses to drive to black and white may vary from about 10-1000 milliseconds, and the pulses may be separated by rests (at zero applied volts) of lengths in the range of 10-1000 milliseconds. Although FIG. 2 shows pulses of positive and negative voltages, respectively, to produce black and white, these pulses being separated by "rests" where zero voltage is supplied, it is sometimes preferred that these "rest" periods comprise pulses of the opposite polarity to the drive pulses, but having lower impulse (i.e., having a shorter duration or a lower applied voltage than the principal drive pulses, or both).

Figure 3A:
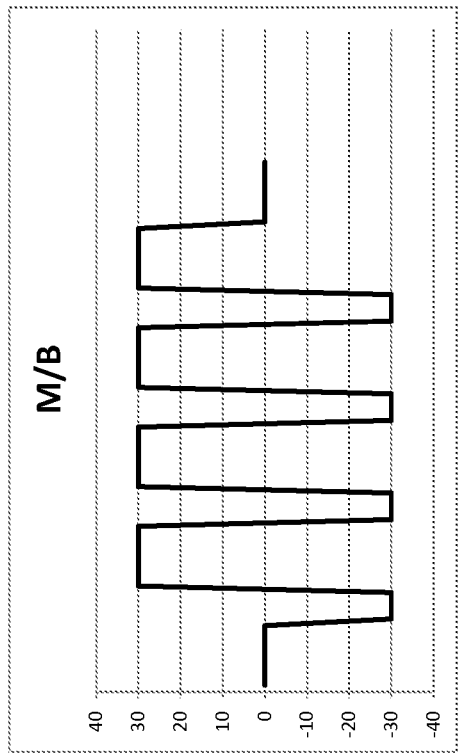
FIGS. 3A and 3B show waveforms used to drive the electrophoretic medium shown in FIG. 1 to its magenta and blue states.
Figure 3B:
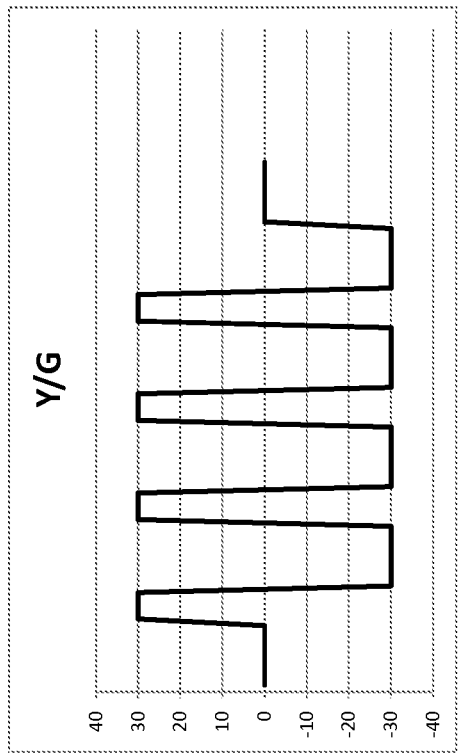
Figure 3C:
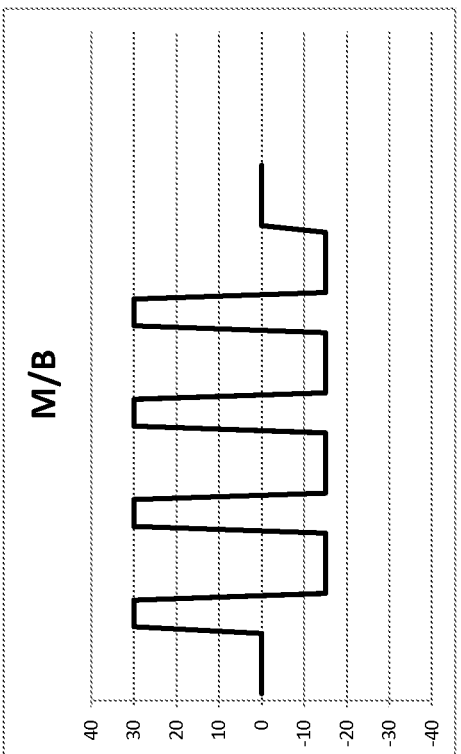
FIGS. 3C and 3D show waveforms used to drive the electrophoretic medium shown in FIG. 1 to its yellow and green states.
Figure 3D:
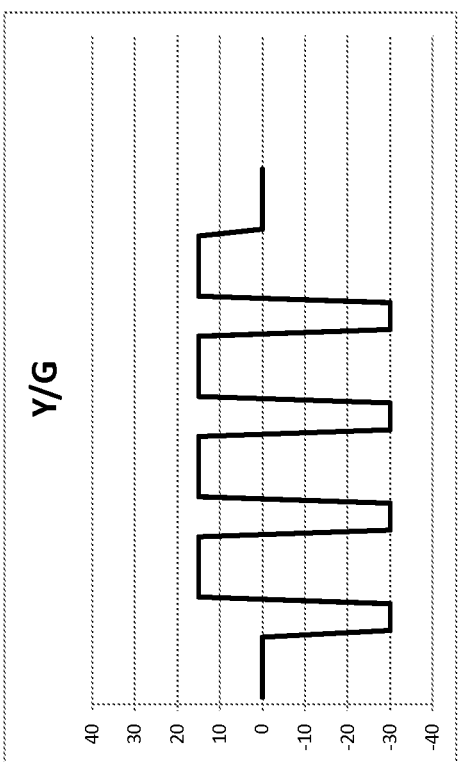

FIGS. 3A-3D show typical color rendering phases of waveforms used to produce the colors magenta and blue (FIGS. 3A and 3B) and yellow and green (FIGS. 3C and 3D). In FIG. 3A, the waveform oscillates between positive and negative impulses, but the length of the positive impulse ($t_p$) is shorter than that of the negative impulse ($t_n$), while the voltage applied in the positive impulse ($V_p$) is greater than that of the negative impulse ($V_n$). When:

$$V_p t_p = V_n t_n$$

the waveform as a whole is "DC-balanced". The period of one cycle of positive and negative impulses may range from about 30-1000 milliseconds.

At the end of the positive impulse, the display is in the blue state, while at the end of the negative impulse the display is in the magenta state. This is consistent with the change in optical density corresponding to motion of the cyan pigment being larger than the change corresponding to motion of the magenta or yellow pigments (relative to the white pigment). According to the hypotheses presented above, this would be expected if the interaction between the magenta pigment and the white pigment were stronger than that between the cyan pigment and the white pigment. The relative mobility of the yellow and white pigments (which are both negatively charged) is much lower that the relative mobility of the cyan and white pigments (which are oppositely charged). Thus, in a preferred waveform to produce magenta or blue, a sequence of impulses comprising at least one cycle of $V_p t_p$ followed by $V_n t_n$ is preferred, where $V_p > V_n$ and $t_p < t_n$. When the color blue is required, the sequence ends on $V_p$ whereas when the color magenta is required the sequence ends on $V_n$.

FIG. 3B shows an alternative waveform for the production of magenta and blue states using only three voltage levels. In this alternative waveform, at least one cycle of $V_p t_p$ followed by $V_n t_n$ is preferred, where $V_p = V_n = V_{high}$ and $t_n < t_p$. This sequence cannot be DC-balanced. When the color blue is required, the sequence ends on $V_p$ whereas when the color magenta is required the sequence ends on $V_n$.

The waveforms shown in FIGS. 3C and 3D are the inverses of those shown in FIGS. 3A and 3B respectively, and produce the corresponding complementary colors yellow and green. In one preferred waveform to produce yellow or green, as shown in FIG. 3C, a sequence of impulses comprising at least one cycle of $V_p t_p$ followed by $V_n t_n$ is used, where $V_p < V_n$ and $t_p > t_n$. When the color green is required, the sequence ends on $V_p$ whereas when the color yellow is required the sequence ends on $V_n$.

Another preferred waveform to produce yellow or green using only three voltage levels is shown in FIG. 3D. In this case, at least one cycle of $V_p t_p$ followed by $V_n t_n$ is used, where $V_p = V_n = V_{high}$ and $t_n > t_p$. This sequence cannot be DC-balanced. When the color green is required, the sequence ends on $V_p$ whereas when the color yellow is required the sequence ends on $V_n$.

Figure 4A:
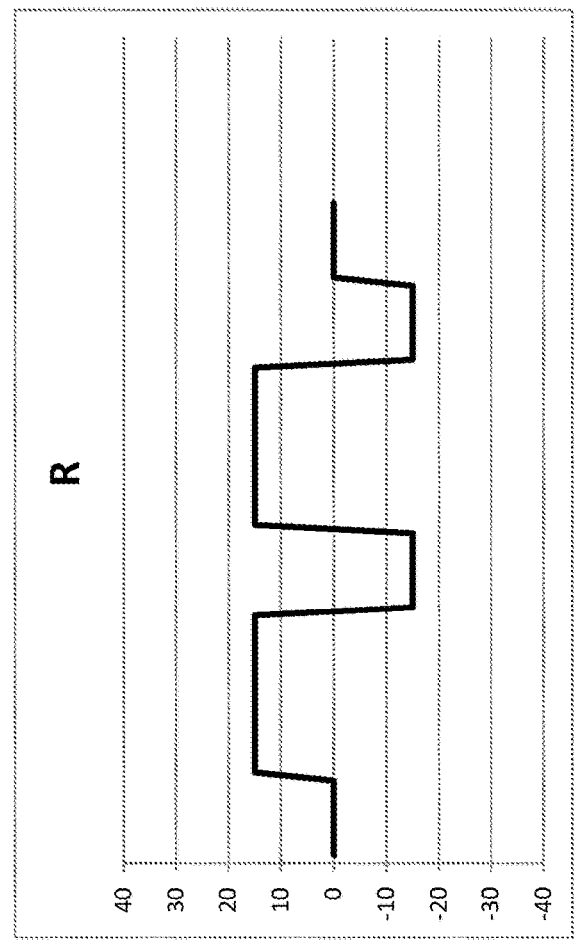
FIGS. 4A and 4B show waveforms used to drive the electrophoretic medium shown in FIG. 1 to its red and cyan states respectively.
Figure 4B:
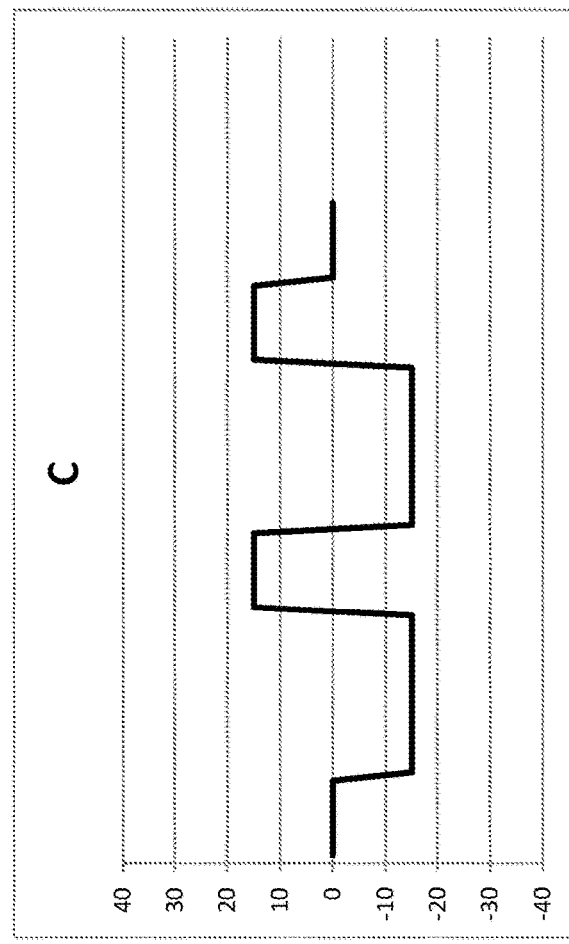

FIGS. 4A and 4B show color rendering phases of waveforms used to render the colors red and cyan on a display of the present invention. These waveforms also oscillate between positive and negative impulses, but they differ from the waveforms of FIGS. 3A-3D in that the period of one cycle of positive and negative impulses is typically longer and the addressing voltages used may be (but are not necessarily) lower. The red waveform of FIG. 4A consists of a pulse ($+V_{low}$) that produces black (similar to the waveform shown in FIG. 2A) followed by a shorter pulse ($-V_{low}$) of opposite polarity, which removes the cyan particles and changes black to red, the complementary color to cyan. The cyan waveform is the inverse of the red one, having a section that produces white ($-V_{low}$) followed by a short pulse ($V_{low}$) that moves the cyan particles adjacent the viewing surface. Just as in the waveforms shown in FIGS. 3A-3D, the cyan moves faster relative to white than either the magenta or yellow pigments. In contrast to the FIG. 3 waveforms, however, the yellow pigment in the FIG. 4 waveforms remains on the same side of the white particles as the magenta particles.

The waveforms described above with reference to FIGS. 2-4 use a five level drive scheme, i.e., a drive scheme in which at any given time a pixel electrode may be at any one of two different positive voltages, two different negative voltages, or zero volts relative to a common front electrode. In the specific waveforms shown in FIGS. 2-4, the five levels are 0, ±15V and ±30V. It has, however, in at least some cases been found to be advantageous to use a seven level drive scheme, which uses seven different voltages: three positive, three negative, and zero. This seven level drive scheme may hereinafter be referred to as the "second drive scheme" of the present invention. The choice of the number of voltages used to address the display should take account of the limitations of the electronics used to drive the display. In general, a larger number of drive voltages will provide greater flexibility in addressing different colors, but complicates the arrangements necessary to provide this larger number of drive voltages to conventional device display drivers. The present inventors have found that use of seven different voltages provides a good compromise between complexity of the display architecture and color gamut.

The general principles used in production of eight primary colors (white, black, cyan, magenta, yellow, red, green and blue) using this second drive scheme applied to a display of the present invention (such as that shown in FIG. 1) will now be described with reference to FIG. 5. As in FIGS. 2-4, it will be assumed that the first pigment is white, the second cyan, the third yellow and the fourth magenta. It will be clear to one of ordinary skill in the art that the colors exhibited by the display will change if the assignment of pigment colors is changed.

The greatest positive and negative voltages (designated±Vmax in FIG. 5) applied to the pixel electrodes produce respectively the color formed by a mixture of the second and fourth particles (cyan and magenta, to produce a blue color—cf. FIG. 1E), or the third particles alone (yellow—cf. FIG. 1B—the white pigment scatters light and lies in between the colored pigments). These blue and yellow colors are not necessarily the best blue and yellow attainable by the display. The mid-level positive and negative voltages (designated±Vmid in FIG. 5) applied to the pixel electrodes produce colors that are black and white, respectively.

Figure 5:
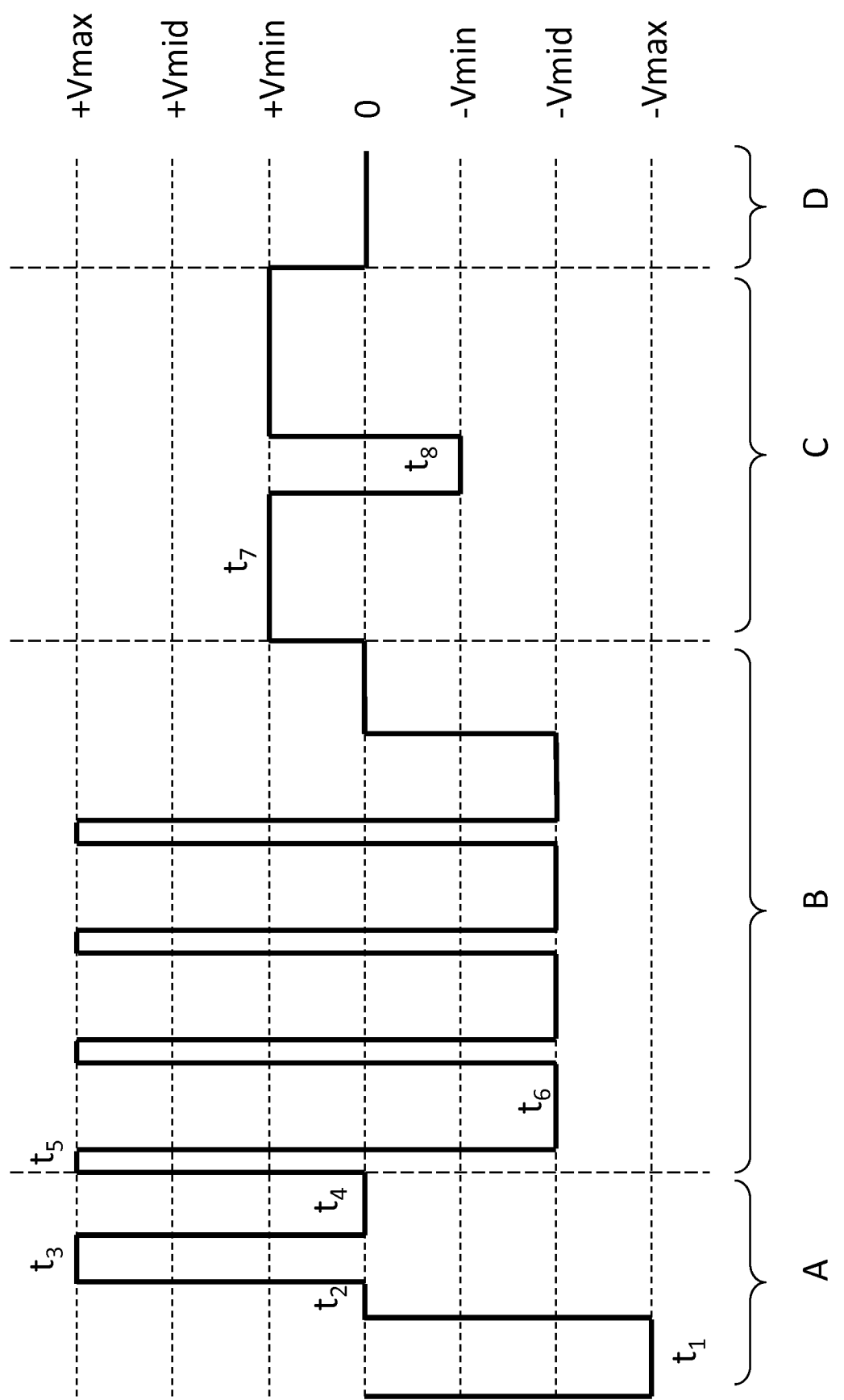
FIGS. 5-6 illustrate waveforms which may be used in place of those shown in FIGS. 2A-2B, 3A-3D and 4A-4B to drive the electrophoretic medium shown in FIG. 1 to all its color states.

From these blue, yellow, black or white optical states, the other four primary colors may be obtained by moving only the second particles (in this case the cyan particles) relative to the first particles (in this case the white particles), which is achieved using the lowest applied voltages (designated±Vmin in FIG. 5). Thus, moving cyan out of blue (by applying −Vmin to the pixel electrodes) produces magenta (cf. FIGS. 1E and 1D for blue and magenta respectively); moving cyan into yellow (by applying +Vmin to the pixel electrodes) provides green (cf. FIGS. 1B and 1G for yellow and green respectively); moving cyan out of black (by applying −Vmin to the pixel electrodes) provides red (cf. FIGS. 1H and 1C for black and red respectively), and moving cyan into white (by applying +Vmin to the pixel electrodes) provides cyan (cf. FIGS. 1A and 1F for white and cyan respectively).

While these general principles are useful in the construction of waveforms to produce particular colors in displays of the present invention, in practice the ideal behavior described above may not be observed, and modifications to the basic scheme are desirably employed.

A generic waveform embodying modifications of the basic principles described above is illustrated in FIG. 5, in which the abscissa represents time (in arbitrary units) and the ordinate represents the voltage difference between a pixel electrode and the common front electrode. The magnitudes of the three positive voltages used in the drive scheme illustrated in FIG. 5 may lie between about +3V and +30V, and of the three negative voltages between about −3V and −30V. In one empirically preferred embodiment, the highest positive voltage, +Vmax, is +24V, the medium positive voltage, +Vmid, is 12V, and the lowest positive voltage, +Vmin, is 5V. In a similar manner, negative voltages−Vmax, −Vmid and −Vmin are; in a preferred embodiment −24V, −12V and −9V. It is not necessary that the magnitudes of the voltages |+V|=|−V| for any of the three voltage levels, although it may be preferable in some cases that this be so.

There are four distinct phases in the generic waveform illustrated in FIG. 5. In the first phase ("A" in FIG. 5), there are supplied pulses (wherein "pulse" signifies a monopole square wave, i.e., the application of a constant voltage for a predetermined time) at +Vmax and −Vmax that serve to erase the previous image rendered on the display (i.e., to "reset" the display). The lengths of these pulses ($t_1$ and $t_3$) and of the rests (i.e., periods of zero voltage between them ($t_2$ and $t_4$) may be chosen so that the entire waveform (i.e., the integral of voltage with respect to time over the whole waveform as illustrated in FIG. 5) is DC balanced (i.e., the integral is substantially zero). DC balance can be achieved by adjusting the lengths of the pulses and rests in phase A so that the net impulse supplied in this phase is equal in magnitude and opposite in sign to the net impulse supplied in the combination of phases B and C, during which phases, as described below, the display is switched to a particular desired color.

The waveform shown in FIG. 5 is purely for the purpose of illustration of the structure of a generic waveform, and is not intended to limit the scope of the invention in any way. Thus, in FIG. 5 a negative pulse is shown preceding a positive pulse in phase A, but this is not a requirement of the invention. It is also not a requirement that there be only a single negative and a single positive pulse in phase A.

As described above, the generic waveform is intrinsically DC balanced, and this may be preferred in certain embodiments of the invention. Alternatively, the pulses in phase A may provide DC balance to a series of color transitions rather than to a single transition, in a manner similar to that provided in certain black and white displays of the prior art; see for example U.S. Pat. No. 7,453,445.

In the second phase of the waveform (phase B in FIG. 5) there are supplied pulses that use the maximum and medium voltage amplitudes. In this phase the colors white, black, magenta, red and yellow are preferably rendered in the manner previously described with reference to FIGS. 2-4.

As described above (see FIG. 2B and related description), white may be rendered by a pulse or a plurality of pulses at −Vmid. In some cases, however, the white color produced in this way may be contaminated by the yellow pigment and appear pale yellow. In order to correct this color contamination, it may be necessary to introduce some pulses of a positive polarity. Thus, for example, white may be obtained by a single instance or a repetition of instances of a sequence of pulses comprising a pulse with length $T_1$ and amplitude+Vmax or +Vmid followed by a pulse with length $T_2$ and amplitude −Vmid, where $T_2 > T_1$. The final pulse should be a negative pulse. In FIG. 5 there are shown four repetitions of a sequence of +Vmax for time $t_5$ followed by −Vmid for time $t_6$. During this sequence of pulses, the appearance of the display oscillates between a magenta color (although typically not an ideal magenta color) and white (i.e., the color white will be preceded by a state of lower L* and higher a* than the final white state). This is similar to the pulse sequence shown in FIG. 3A, in which an oscillation between magenta and blue was observed. The difference here is that the net impulse of the pulse sequence is more negative than the pulse sequence shown in FIG. 3A, and thus the oscillation is biased towards the negatively charged white pigment.

As described above (see FIG. 3A and related description), black may be obtained by a rendered by a pulse or a plurality of pulses (separated by periods of zero voltage) at +Vmid.

As described above (see FIGS. 3A and 3B and related description), magenta may be obtained by a single instance or a repetition of instances of a sequence of pulses comprising a pulse with length $T_3$ and amplitude+Vmax or +Vmid, followed by a pulse with length $T_4$ and amplitude −Vmid, where $T_4>T_3$. To produce magenta, the net impulse in this phase of the waveform should be more positive than the net impulse used to produce white. During the sequence of pulses used to produce magenta, the display will oscillate between states that are essentially blue and magenta. The color magenta will be preceded by a state of more negative a* and lower L* than the final magenta state.

As described above (see FIG. 4A and related description), red may be obtained by a single instance or a repetition of instances of a sequence of pulses comprising a pulse with length $T_5$ and amplitude+Vmax or +Vmid, followed by a pulse with length $T_6$ and amplitude −Vmax or −Vmid. To produce red, the net impulse should be more positive than the net impulse used to produce white or yellow. Preferably, to produce red, the positive and negative voltages used are substantially of the same magnitude (either both Vmax or both Vmid), the length of the positive pulse is longer than the length of the negative pulse, and the final pulse is a negative pulse. During the sequence of pulses used to produce red, the display will oscillate between states that are essentially black and red. The color red will be preceded by a state of lower L*, lower a*, and lower b* than the final red state.

Yellow (see FIGS. 3C and 3D and related description) may be obtained by a single instance or a repetition of instances of a sequence of pulses comprising a pulse with length $T_7$ and amplitude+Vmax or +Vmid, followed by a pulse with length $T_8$ and amplitude −Vmax. The final pulse should be a negative pulse. Alternatively, as described above, the color yellow may be obtained by a single pulse or a plurality of pulses at −Vmax.

In the third phase of the waveform (phase C in FIG. 5) there are supplied pulses that use the medium and minimum voltage amplitudes. In this phase of the waveform the colors blue and cyan are produced following a drive towards white in the second phase of the waveform, and the color green is produced following a drive towards yellow in the second phase of the waveform. Thus, when the waveform transients of a display of the present invention are observed, the colors blue and cyan will be preceded by a color in which b* is more positive than the b* value of the eventual cyan or blue color, and the color green will be preceded by a more yellow color in which L* is higher and a* and b* are more positive than L*, a* and b* of the eventual green color. More generally, when a display of the present invention is rendering the color corresponding to the colored one of the first and second particles, that state will be preceded by a state that is essentially white (i.e., having C* less than about 5). When a display of the present invention is rendering the color corresponding to the combination of the colored one of the first and second particles and the particle of the third and fourth particles that has the opposite charge to this particle, the display will first render essentially the color of the particle of the third and fourth particles that has the opposite charge to the colored one of the first and second particles.

Typically, cyan and green will be produced by a pulse sequence in which +Vmin must be used. This is because it is only at this minimum positive voltage that the cyan pigment can be moved independently of the magenta and yellow pigments relative to the white pigment. Such a motion of the cyan pigment is necessary to render cyan starting from white or green starting from yellow.

Finally, in the fourth phase of the waveform (phase D in FIG. 5) there is supplied a zero voltage.

Although the display of the invention has been described as producing eight primary colors, in practice, it is preferred that as many colors as possible be produced at the pixel level. A full color gray scale image may then be rendered by dithering between these colors, using techniques well known to those skilled in imaging technology and described in more detail below. For example, in addition to the eight primary colors produced as described above, the display may be configured to render an additional eight colors. In one embodiment, these additional colors are: light red, light green, light blue, dark cyan, dark magenta, dark yellow, and two levels of gray between black and white. The terms "light" and "dark" as used in this context refer to colors having substantially the same hue angle in a color space such as CIE L*a*b* as the reference color but a higher or lower L*, respectively.

In general, light colors are obtained in the same manner as dark colors, but using waveforms having slightly different net impulse in phases B and C. Thus, for example, light red, light green and light blue waveforms have a more negative net impulse in phases B and C than the corresponding red, green and blue waveforms, whereas dark cyan, dark magenta, and dark yellow have a more positive net impulse in phases B and C than the corresponding cyan, magenta and yellow waveforms. The change in net impulse may be achieved by altering the lengths of pulses, the number of pulses, or the magnitudes of pulses in phases B and C.

Gray colors are typically achieved by a sequence of pulses oscillating between low or mid voltages.

It will be clear to one of ordinary skill in the art that in a display of the invention driven using a thin-film transistor (TFT) array the available time increments on the abscissa of FIG. 5 will typically be quantized by the frame rate of the display. Likewise, it will be clear that the display is addressed by changing the potential of the pixel electrodes relative to the front electrode and that this may be accomplished by changing the potential of either the pixel electrodes or the front electrode, or both. In the present state of the art, typically a matrix of pixel electrodes is present on the backplane, whereas the front electrode is common to all pixels. Therefore, when the potential of the front electrode is changed, the addressing of all pixels is affected. The basic structure of the waveform described above with reference to FIG. 5 is the same whether or not varying voltages are applied to the front electrode.

The generic waveform illustrated in FIG. 5 requires that the driving electronics provide as many as seven different voltages to the data lines during the update of a selected row of the display. While multi-level source drivers capable of delivering seven different voltages are available, many commercially-available source drivers for electrophoretic displays permit only three different voltages to be delivered during a single frame (typically a positive voltage, zero, and a negative voltage). Herein the term "frame" refers to a single update of all the rows in the display. It is possible to modify the generic waveform of FIG. 8 to accommodate a three level source driver architecture provided that the three voltages supplied to the panel (typically +V, 0 and −V) can be changed from one frame to the next. (i.e., such that, for example, in frame n voltages (+Vmax, 0, −Vmin) could be supplied while in frame n+1 voltages (+Vmid, 0, −Vmax) could be supplied).

Figure 6:
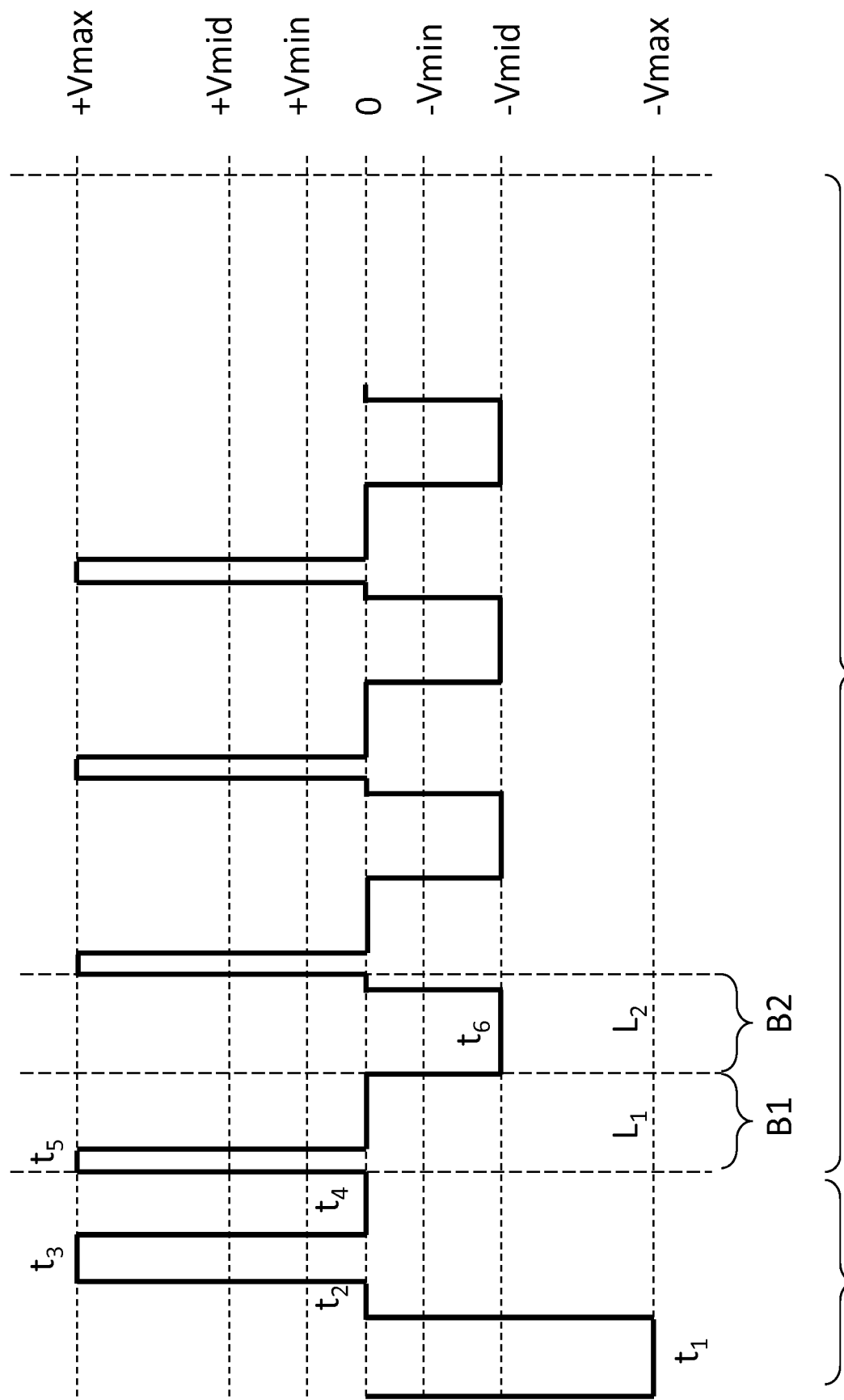

Since the changes to the voltages supplied to the source drivers affect every pixel, the waveform needs to be modified accordingly, so that the waveform used to produce each color must be aligned with the voltages supplied. FIG. 6 shows an appropriate modification to the generic waveform of FIG. 5. In phase A, no change is necessary, since only three voltages (+Vmax, 0, −Vmax) are needed. Phase B is replaced by subphases B1 and B2 are defined, of lengths $L_1$ and $L_2$, respectively, during each of which a particular set of three voltages are used. In FIG. 6, in phase B1 voltages+ Vmax, 0, −Vmax are available, while in phase B2 voltages +Vmid, 0, −Vmid are available. As shown in FIG. 6, the waveform requires a pulse of +Vmax for time $t_5$ in subphase B1. Subphase B1 is longer than time $t_5$ (for example, to accommodate a waveform for another color in which a pulse longer than $t_5$ might be needed), so a zero voltage is supplied for a time $L_1-t_5$. The location of the pulse of length $t_5$ and the zero pulse or pulses of length $L_1-t_5$ within subphase B1 may be adjusted as required (i.e., subphase B1 does not necessarily begin with the pulse of length $t_5$ as illustrated). By subdividing the phases B and C in to subphases in which there is a choice of one of the three positive voltages, one of the three negative voltages and zero, it is possible to achieve the same optical result as would be obtained using a multilevel source driver, albeit at the expense of a longer waveform (to accommodate the necessary zero pulses).

When top plane switching is used in combination with a three-level source driver, the same general principles apply as described above with reference to FIG. 6. Top plane switching may be preferred when the source drivers cannot supply a voltage as high as the preferred Vmax. Methods for driving electrophoretic displays using top plane switching are well known in the art.

A typical waveform according to the second drive scheme of the invention is shown below in Table 1, where the numbers in parentheses correspond to the number of frames driven with the indicated backplane voltage (relative to a top plane assumed to be at zero potential).

TABLE 1

|   | Reset Phase |   | High/Mid V Phase (N repetitions of frame sequence below) |   |   | Low/Mid V phase |   |
|---|---|---|---|---|---|---|---|
| K | −Vmax(60 + $\Delta_K$) | Vmax(60 − $\Delta_K$) | Vmid(5) | Zero(9) |   | Zero(50) |   |
| B | −Vmax(60 + $\Delta_B$) | Vmax(60 − $\Delta_B$) | Vmax(2) | Zero(5) | −Vmid(7) | Vmid(40) | Zero(10) |
| R | −Vmax(60 + $\Delta_R$) | Vmax(60 − $\Delta_R$) | Vmax(7) | Zero(3) | −Vmax(4) | Zero(50) |   |
| M | −Vmax(60 + $\Delta_M$) | Vmax(60 − $\Delta_M$) | Vmax(4) | Zero(3) | −Vmid(7) | Zero(50) |   |
| G | −Vmax(60 + $\Delta_G$) | Vmax(60 − $\Delta_G$) | Vmid(7) | Zero(3) | −Vmax(4) | Vmin(40) | Zero(10) |
| C | −Vmax(60 + $\Delta_C$) | Vmax(60 − $\Delta_C$) | Vmax(2) | Zero(5) | −Vmid(7) | Vmin(40) | Zero(10) |
| Y | −Vmax(60 + $\Delta_Y$) | Vmax(60 − $\Delta_Y$) | Vmid(7) | Zero(3) | −Vmax(4) | Zero(50) |   |
| W | −Vmax(60 + $\Delta_W$) | Vmax(60 − $\Delta_W$) | Vmax(2) | Zero(5) | −Vmid(7) | Zero(50) |   |

In the reset phase, pulses of the maximum negative and positive voltages are provided to erase the previous state of the display. The number of frames at each voltage are offset by an amount (shows as $\Delta_x$ for color x) that compensates for the net impulse in the High/Mid voltage and Low/Mid voltage phases, where the color is rendered. To achieve DC balance, $\Delta_x$ is chosen to be half that net impulse. It is not necessary that the reset phase be implemented in precisely the manner illustrated in the Table; for example, when top plane switching is used it is necessary to allocate a particular number of frames to the negative and positive drives. In such a case, it is preferred to provide the maximum number of high voltage pulses consistent with achieving DC balance (i.e., to subtract $2\Delta_x$ from the negative or positive frames as appropriate).

In the High/Mid voltage phase, as described above, a sequence of N repetitions of a pulse sequence appropriate to each color is provided, where N can be 1-20. As shown, this sequence comprises 14 frames that are allocated positive or negative voltages of magnitude Vmax or Vmid, or zero. The pulse sequences shown are in accord with the discussion given above. It can be seen that in this phase of the waveform the pulse sequences to render the colors white, blue and cyan are the same (since blue and cyan are achieved in this case starting from a white state, as described above). Likewise, in this phase the pulse sequences to render yellow and green are the same (since green is achieved starting from a yellow state, as described above).

In the Low/Mid voltage phase the colors blue and cyan are obtained from white, and the color green from yellow.

Table 2 shows typical results from driving a display of the invention. The waveform used was similar to that illustrated in Table 1 where N=18, and the display was addressed at 65 frames per second with preferred voltages as described above.

TABLE 2

| Color | L* | a* | b* |
|---|---|---|---|
| K | 20 | 4 | −5 |
| B | 24 | 5 | −13 |
| R | 42 | 27 | 23 |
| M | 40 | 25 | 0 |
| G | 36 | −12 | 6 |
| C | 37 | −8 | −15 |
| Y | 65 | 3 | 40 |
| W | 70 | 2 | 5 |
| Gamut Volume ($\Delta E^3$) | 20630 |   |   |

It will be clear from Table 1 that a typical waveform used to render a particular color on a display of the invention may use 100-1000 frames, during each of which there is a choice of 3-7 different voltages that may be applied to a pixel. Thus, there is an enormous number of possible waveforms that might be used. In practice, however, only a relatively small number of waveforms are likely to be stored in a waveform lookup table. In the current state of the art, typically 16 (4-bit) or 32 (5-bit) different color states are supported (although, as will be clear to those of skill in the art, a much larger number of waveforms are stored, since for each color state there may be different waveforms that are required depending upon, for example, the prior state of the display, the temperature, the nature of the update (global or local), etc.). There is thus a need to select from the myriad possible colors that may be rendered by the plethora of possible waveforms a set of a small number of colors (minimally 8, but preferably 16 or 32) to be rendered at a pixel level. A full-color image is produced by dithering between these pixel colors, as is known in the art. Rendering color in this way is different from rendering color in a typical emissive display, or in conventional color printing.

FIG. 7A shows a traditional method for rendering a full color image on a reflective medium (such as white paper) using a printer such as an ink-jet printer or CMYK halftone process. Transparent or translucent inks are available in the three subtractive primary colors as well as an optional black. The dots of ink are applied sequentially in such a way that they may be overlaid. Thus the color red, for example, is obtained by an overlay of magenta and yellow dots. A full-color image requires dots of no more than the three subtractive primary colors.

FIG. 7B shows the situation with a reflective display (for example, a reflective electrophoretic display) that renders black, white, and gray colors overlaid with a color filter array. A full color image is a composite of modulated red, green, blue and, optionally, black and white pixels that are separate from each other and arranged side-by-side. It is not possible to render a particular color over the whole area of such a display. For example, to render the color red, the electrophoretic ink behind the blue and green color filters must be switched to black and the black and white pixel may be black, white or gray (depending upon the lightness of the red color that is desired).

FIG. 7C shows an electrophoretic display of the present invention that can render at least the colors red, green, blue, cyan, magenta, yellow, white and black at each pixel location. The precise arrangement of pigments needed to achieve these colors is described above. Note that in this case it is not sufficient (as in printing) to employ only the subtractive primary colors, since the pixels are still arranged side by side and the subtractive colors cannot be overlaid to form the additive primary colors. It is also not sufficient to employ only the additive primary colors, as in this case the subtractive primary colors cannot be rendered with 100% area coverage.

Electrophoretic displays of the present invention are typically capable of rendering many different colors at each pixel location, but these colors will not be selectable by independent manipulation of three control variables (in contrast to a display having a color filter array, as described in reference to FIG. 1B, in which, for example, the reflectivity of the red pixel may be controlled independently of the reflectivity of the green pixel). As described above, in an electrophoretic display of the present invention, the colors are typically rendered by controlling the motion of pigment particles, which may be white, cyan, magenta and yellow in color, within a single layer of electrophoretic material. The motions of these pigment particles are typically not independently controllable (i.e., an electrical impulse that causes motion of one pigment particle will also move the others). Therefore, in a display of the present invention, certain RGB combinations may be possible to render at the pixel level while others are not.

In one embodiment of the present invention, a full color image is obtained by dithering with a color palette at the pixel level consisting of red, green, blue, cyan, magenta, yellow, white and black, corresponding to RGB values in the source space (i.e., in the color space of the image to rendered) of [255,0,0], [0,255,0], [0,0,255], [0,255,255], [255,0,255], [255, 255,0], [255,255,255] and [0,0,0]. These primary colors are shown in FIG. 8 and are hereinafter referred to as per-pixel palette primary colors, also herein referred to as "device primaries" or a "first color set".

The assignment of a particular color available to a display of the present invention at the pixel level as a device primary may be performed, for example, by sampling all the colors available to the display at the pixel level and selecting the eight colors that are closest to the standard in a particular color space. For example, the colors rendered by the display may be measured in the CIELab color space and those with the closest vector distance to the colors may be chosen as the eight device primaries.

Figure 8:
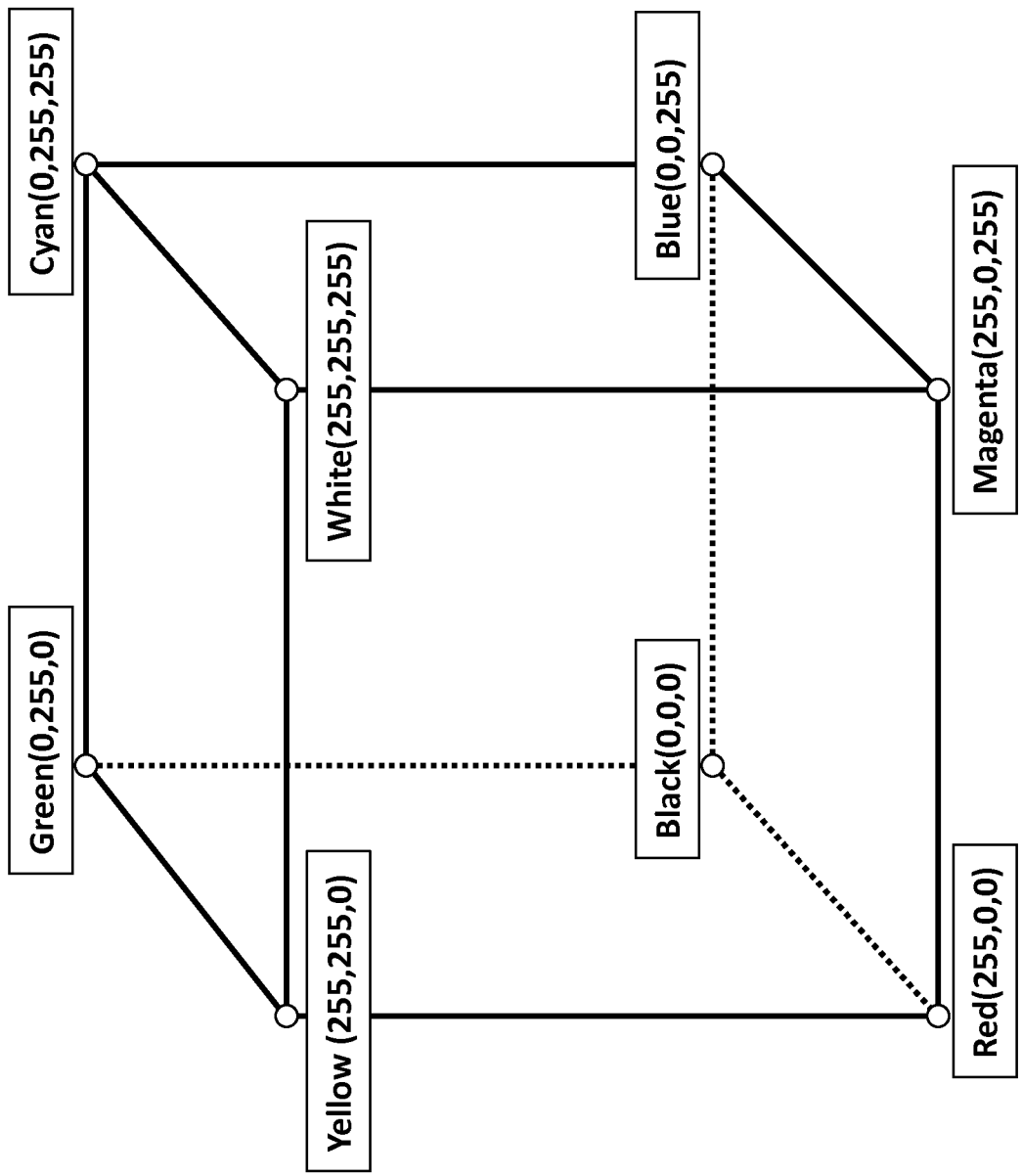
FIGS. 8-14 show RGB values for the various choices of a per-pixel color palette according to the invention.

In practice, it is not likely to be possible to match exactly the ideal colors shown in FIG. 8, and some method for determining which colors most closely approximate the ideal must be provided. One approach is to address the display with waveforms in which the waveform parameters such as those shown in Table 1 are varied and to measure the colors that are rendered. From this set of rendered colors, those with the closest approach to the standard in a particular color space may be identified. This approach was used to generate the colors shown in Table 2.

Table 3 shows, in units of optical density, some colors obtained using a display addressed as described above with respect to Tables 1 and 2.

TABLE 3

| Color | OD (450 nm) | OD (550 nm) | OD (650 nm) | Difference (1) | Difference (2) | Average difference |
|---|---|---|---|---|---|---|
| R | 1.42 | 1.21 | 0.51 | 0.91 | 0.70 | 0.81 |
| G | 0.89 | 0.69 | 0.85 | 0.20 | 0.16 | 0.18 |
| B | 0.98 | 1.30 | 1.26 | 0.31 | 0.28 | 0.29 |
| C | 0.53 | 0.67 | 0.81 | 0.14 | 0.28 | 0.21 |
| M | 0.86 | 1.00 | 0.49 | 0.14 | 0.50 | 0.32 |
| Y | 0.73 | 0.34 | 0.26 | 0.39 | 0.47 | 0.43 |
| K | 1.34 | 1.53 | 1.41 | 0.19 | 0.12 | 0.16 |
| W | 0.37 | 0.32 | 0.28 | 0.05 | 0.09 | 0.07 |

For the colors Red, Green and Blue the optical densities measured at 650 nm, 550 nm, and 450 nm, respectively (shown in bold in the table) should be lower than the average of the optical densities measured at the other two of the three wavelengths by at least 0.2 OD, and lower than either of the optical densities measured at the other two of the three wavelengths by at least 0.1 OD. It can be seen that the green color rendered in this particular display was not within this basic preferred specification.

For the colors Cyan, Magenta and Yellow the optical densities measured at 650 nm, 550 nm, and 450 nm, respectively (shown underlined in the table) should be higher than the average of the optical densities measured at the other two of the three wavelengths by at least 0.2 OD, and higher than either of the optical densities measured at the other two of the three wavelengths by at least 0.1 OD.

For the colors Black (K) and White, the optical densities measured at 650 nm, 550 nm, and 450 nm, respectively, should not differ by more than 0.2 OD.

When the device primary colors differ greatly from the target colors in the source space (such as the colors shown in Table 3), the following procedure may be used to render images on the display.

First, the L*a*b* (CIELAB 1978, D65/2) values are measured for each color. These L*a*b* values are converted to the sRGB (0-255) color space using a known transformation matrix. The result is a set of points that represents the actual device primary colors in sRGB space.

This set of points may be arbitrarily transformed in order to facilitate the dithering that is used to render the colored image. For example, the sRGB values of the measured primaries may be moved closer to the target points in the source space. The target image in the source space may also be transformed, for example by being linearly scaled to correspond to the measured black and white states of the display (i.e., each point in the image may be normalized to the measured dynamic range of the display).

Following such transformations, the image dithering may be performed using algorithms that are known in the art, such as Floyd-Steinberg dithering.

If the resolution of the display is sufficiently high and the viewing distance sufficiently long, it may be adequate to dither between only the eight device primaries. In practice, however, it may be necessary to provide more per-pixel palette components than just these eight primary colors.

For example, for an informational sign designed to be viewed at a distance of 1 meter, the individual pixels become non-objectionable to a typical viewer when they are squares of side length 0.25 mm. Rendering images using just the eight device primaries at this pixel resolution leads, however, to unacceptable image artifacts, no matter which of the prior art dithering algorithms is employed. Typically, in gray-scale ramps between light and dark colors (i.e., gradients in lightness) abrupt transitions may lead to a speckled appearance of mid-tones. This problem may be addressed by using a higher pixel resolution (for example, using square pixels of less than, say, 0.125 mm in side length. Such a display, however, would require more driving circuits, which would increase its cost.

According to the present invention, it is preferred to maintain the resolution of the display and to increase the number of colors available in the per-pixel palette. As described above, the per-pixel palette consisted of 8 colors (i.e., $2^3$). However, with a four-bit waveform, 16 per-pixel colors may be addressable, and with a five-bit waveform, 32 per-pixel colors may be addressable, so the per-pixel color palette may be expanded.

Figure 9:
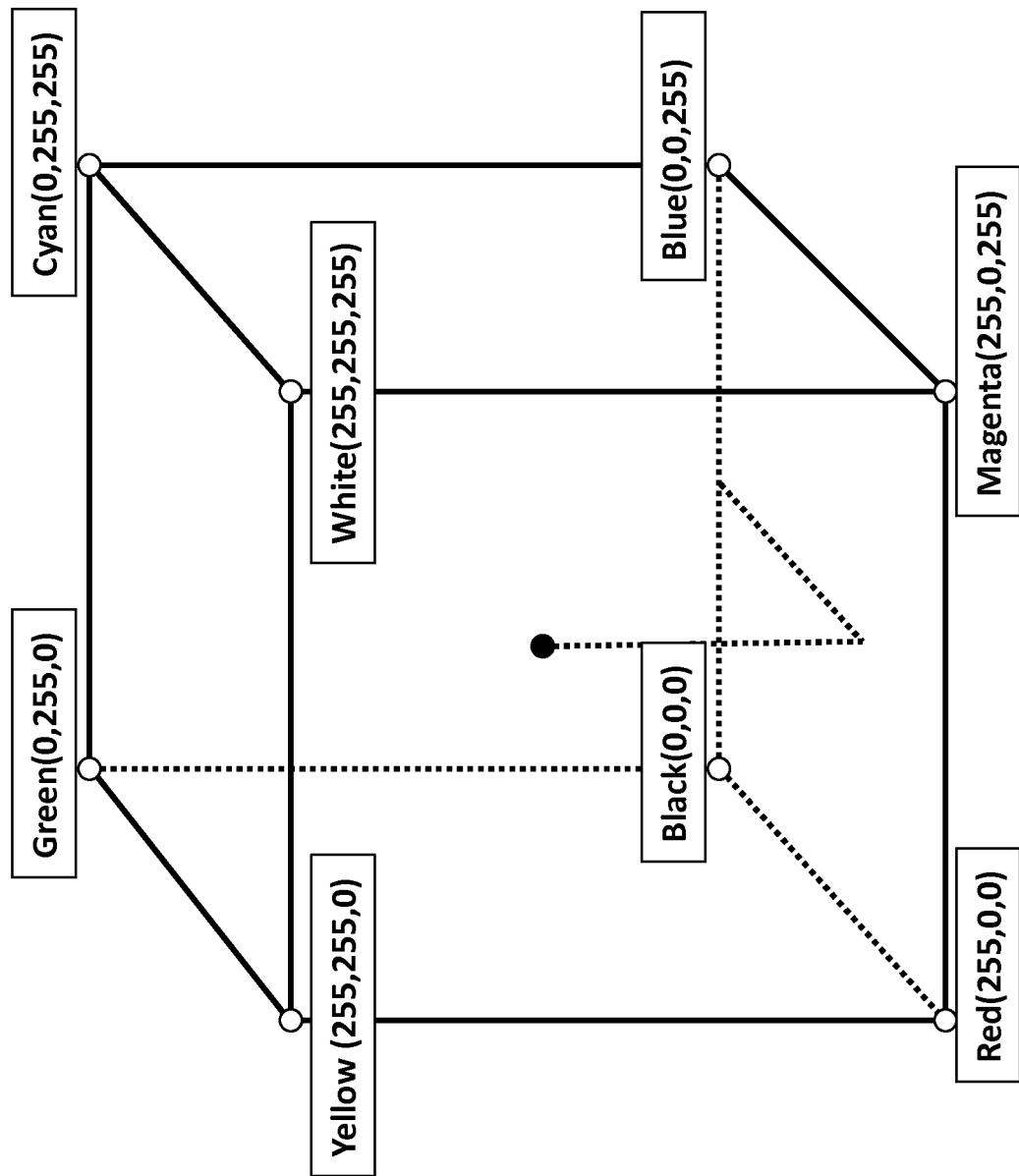

FIG. 9 shows one solution or embodiment to the problem of the speckle in the gray-scale ramp described above. Using only eight device primaries, gray levels are available only by dithering between black and white. Introducing a single intermediate gray point, as shown in FIG. 9, having RGB value in the source space of [127,127,127] (or in practice an L* value intermediate between the black and white states), alleviates the problem. Since there are actually an additional eight (8) addressable states available with a four-bit waveform, according to one embodiment of the invention these are assigned intermediate gray levels between [0,0,0] and [255,255,255] (i.e., spaced along the black/white diagonal in FIG. 9).

The actual assignment of intermediate colors in the per-pixel palette is performed using the same color space as was used to assign the device primary colors. For example, using the CIELab color space, these colors are different levels of gray and as such should not have C*>5 (where C* is the distance from the L* axis and is defined as: $C^* = \sqrt{a^{*2} + b^{*2}}$).

Figure 10:
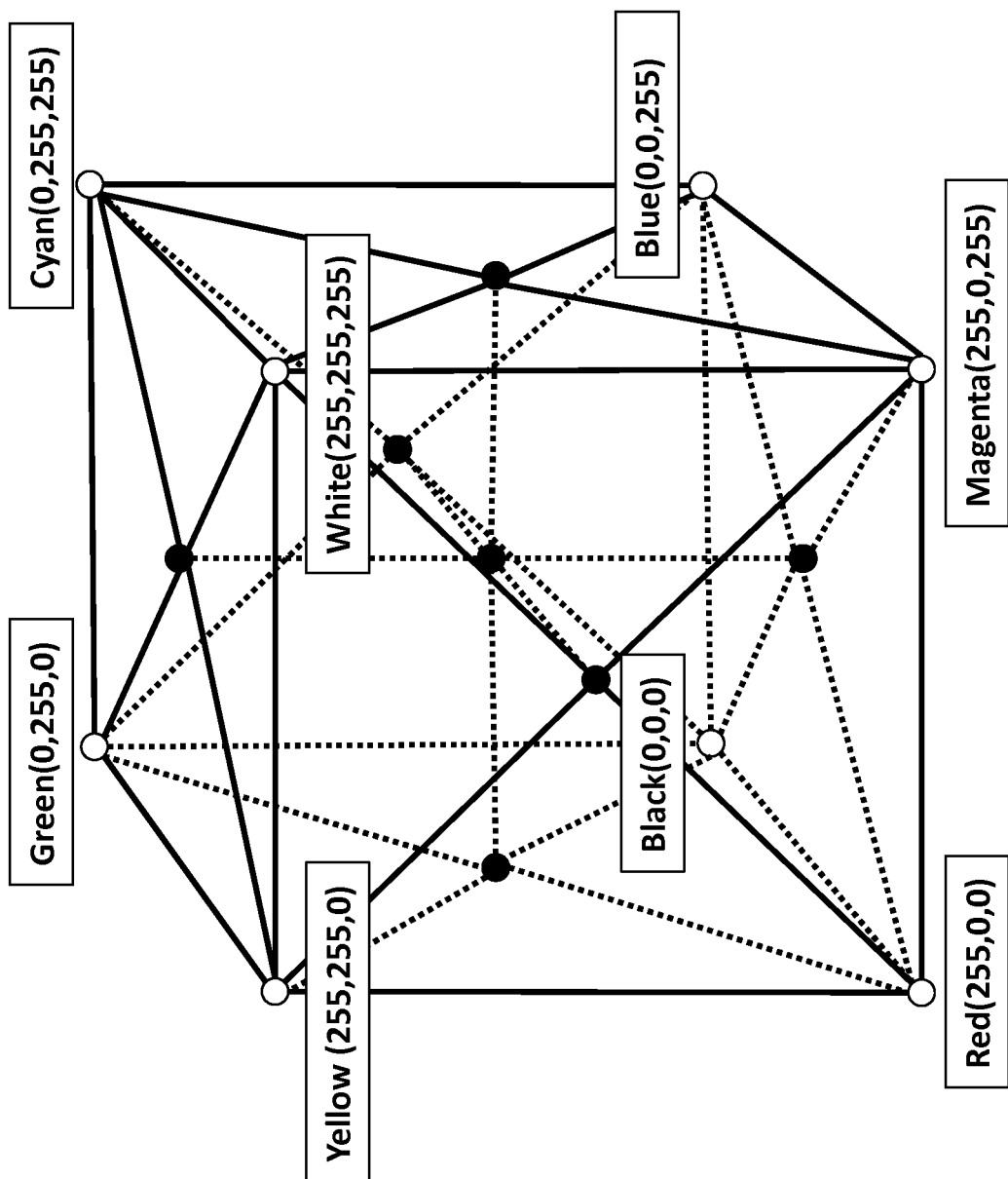

FIG. 10 shows an alternative embodiment of intermediate colors in the per-pixel palette used with a four-bit waveform according to the invention. In addition to the device primaries defined above, there are an additional six intermediate colors that comprise the centers of the faces of the color cube. These six intermediate colors correspond to RGB values in the source space of [127,127,0] (dark yellow), [127,0,127] (dark magenta), [0,127,127] (dark cyan), [127,127,255] (light red), [127,255,127] (light green) and [255,127,127] (light blue). The remaining two intermediate colors may be assigned along the white/black diagonal (i.e., using the CIELab color space, these colors are different levels of gray and as such should not have C*>5).

The actual colors of the intermediate colors of the per-pixel palette according to the invention may be measured in the CIELab (or other) color space with reference to either the eight device primaries described above. For example, the intermediate color in the white/yellow/red/magenta face of the color cube should be approximately equidistant (i.e., not differing from equidistant by more than 10 dE* units) from each diagonal pair of primary (corner) points, such that it is approximately centered on the face of the color cube.

Table 4 shows the optical densities of intermediate colors obtained using the same display of the invention as was used above to obtain the colors shown in Table 3.

TABLE 4

| Color | OD (450 nm) | OD (550 nm) | OD (650 nm) | Difference (1) | Difference (2) | Average difference |
|---|---|---|---|---|---|---|
| Light red | 0.86 | 0.71 | 0.34 | 0.52 | 0.36 | 0.44 |
| Light green | 0.85 | 0.53 | 0.57 | 0.32 | 0.04 | 0.18 |
| Light blue | 0.51 | 0.63 | 0.59 | 0.12 | 0.09 | 0.10 |
| Dark cyan | 0.73 | 0.95 | <u>1.17</u> | 0.22 | 0.43 | 0.33 |
| Dark magenta | 1.12 | <u>1.32</u> | 0.90 | 0.20 | 0.42 | 0.31 |
| Dark yellow | <u>0.98</u> | 0.70 | 0.76 | 0.28 | 0.22 | 0.25 |
| Dark grey | 0.80 | 0.87 | 0.74 | 0.07 | 0.13 | 0.10 |
| Light gray | 0.57 | 0.55 | 0.46 | 0.02 | 0.12 | 0.07 |

The same criteria as described above with reference to Table 3 apply to the lighter and darker colors designated "red", "green", "blue", "cyan", "magenta", and "yellow". The light versions of red, green and blue should have optical densities measured at 650 nm, 550 nm, and 450 nm, respectively, that are lower than those of "red", "green" and "blue" by at least 0.1 OD.

The dark versions of "cyan", "magenta" and "yellow" should have optical densities that are higher than those of "cyan", "magenta" and "yellow" by at least 0.1 OD.

Figure 11:
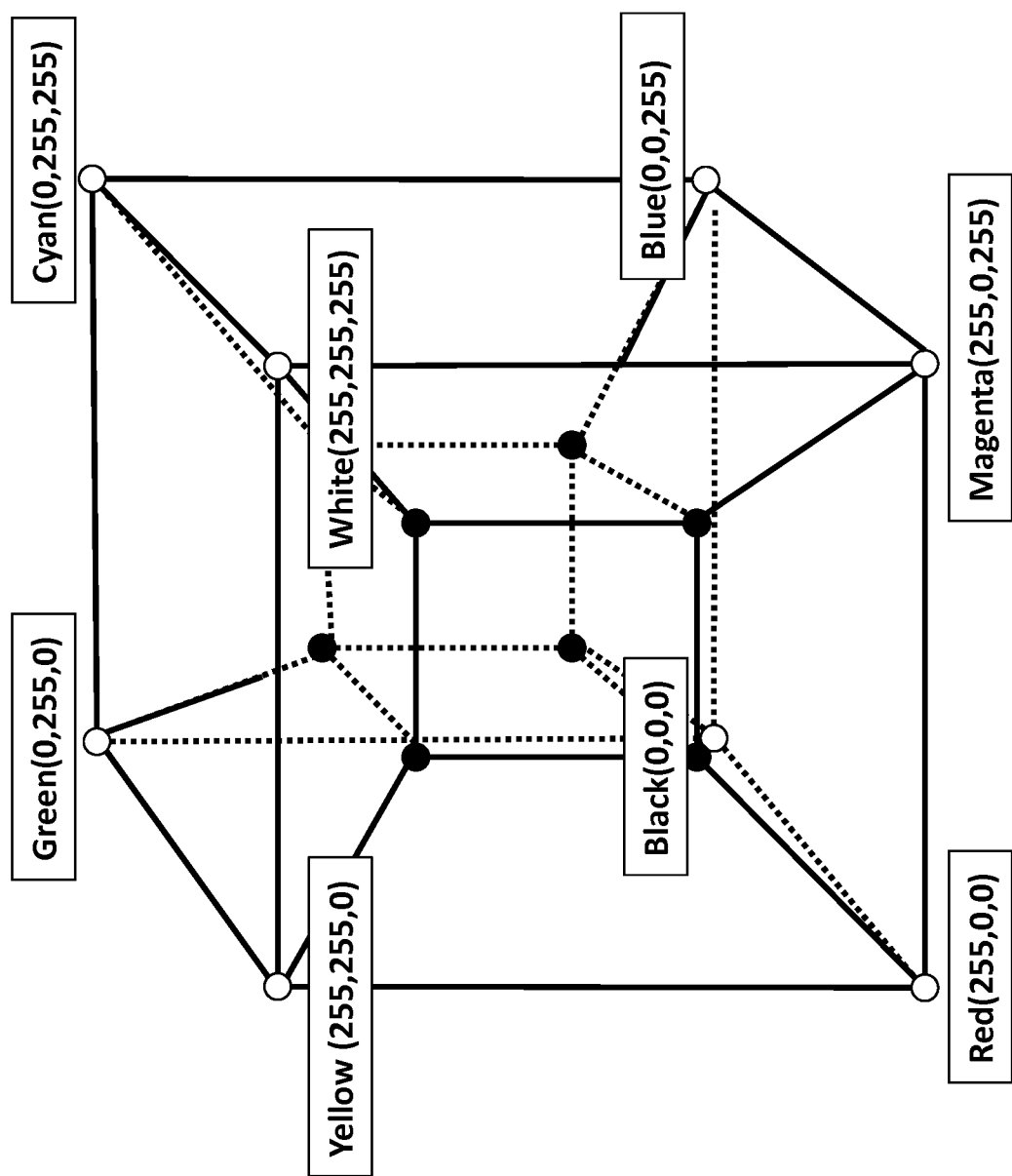

Yet another alternative choice of intermediate colors for the per-pixel palette according to the invention is shown in FIG. 11. In this case, a second color cube, having a side length that is one-third the primary cube, is employed. The coordinates of the second color cube correspond to RGB values in the source space of [170,85,85], [85,170,85], [85,85,170], [85,170,170], [170,85,170], [170, 170,85], [170,170,170] and [85,85,85].

Figure 12:
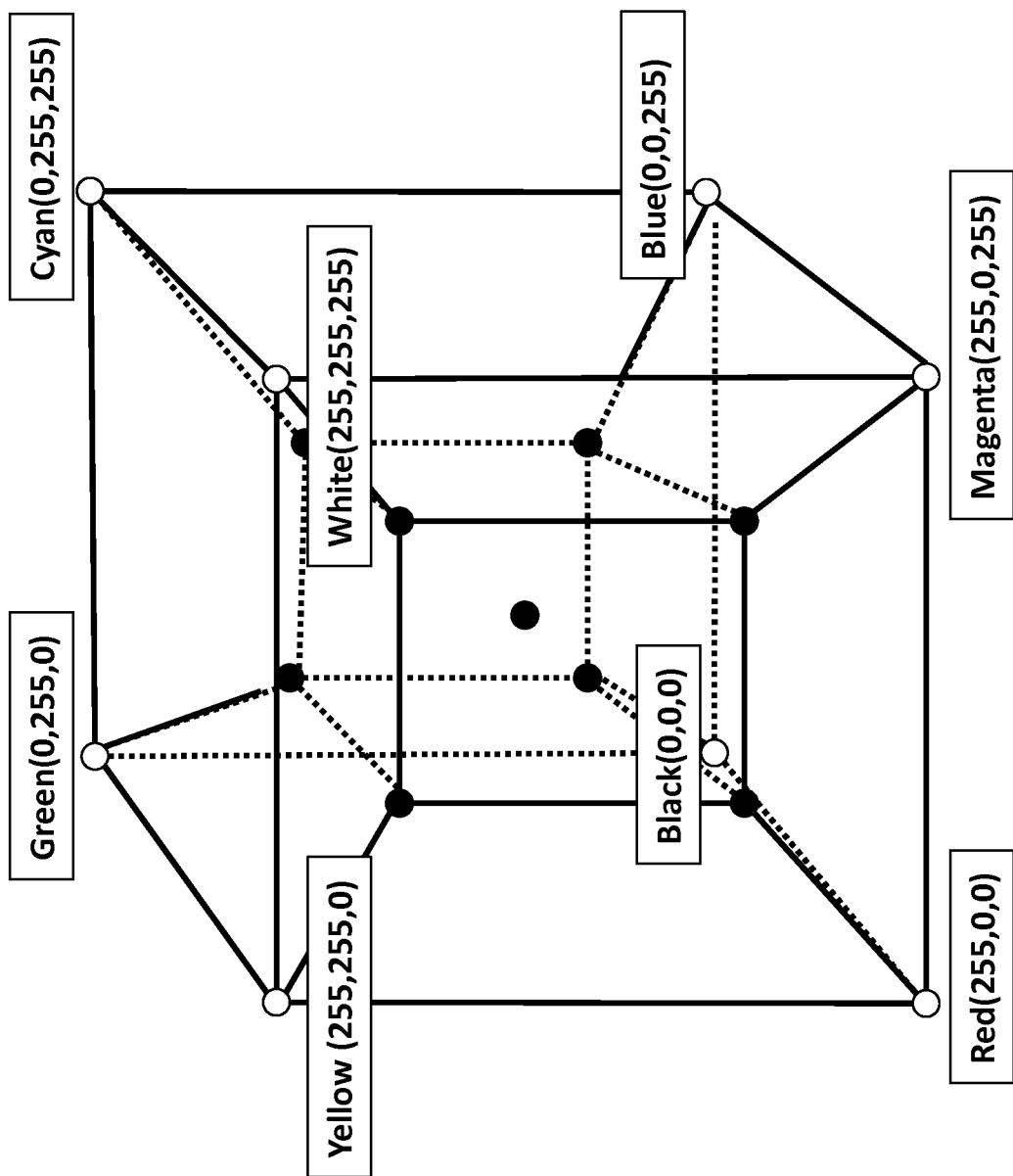

In the color palette of the invention shown in FIGS. 10 and 11, there are only 3 and 4 points, respectively, on the gray axis. If a five-bit addressing waveform is available, additional points along the gray axis may be added to FIG. 10 or 11. Such a single point added to FIG. 11 is shown in FIG. 12.

Figure 13:
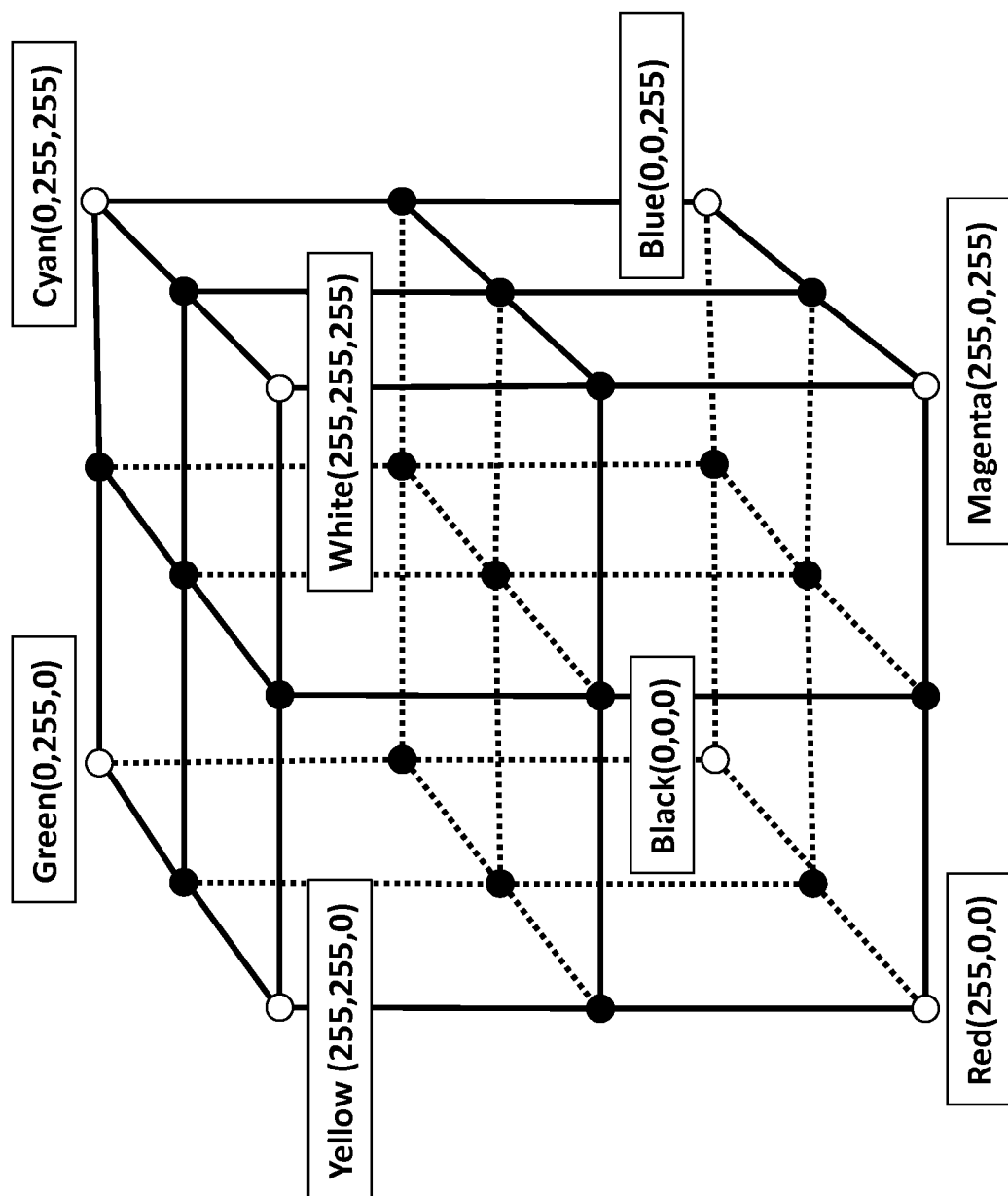

Yet another alternative choice of intermediate colors for the per-pixel palette with five-bit addressing (32 states) according to the invention is shown in FIG. 13. In this case, in addition to the per-pixel palette primary components defined above, there are 19 intermediate colors that correspond to the midpoints of each of the faces and edges of the color cube. These coordinates correspond to RGB values in the source space of [0,0,127], [0,127,0], [0,127,127], [0,127, 255], [0,255,127], [127,0,0,], [127,0,127], [127,0,255], [127,127,0], [127,127,127], [127,127,255], [127,255,0], [127,255,127], [127,255,255], [255,0,127], [255,127,0], [255,127,127], [255,127,255], and [255,255,127]. These correspond to the colors Navy Blue, Office Green, Teal, Pure Blue, Cyan Lime, Maroon, Purple, Violet, Olive, Gray, Light Blue, Green, Light Lime, Light Cyan, Pink, Orange, Light Red, Light Magenta, and Light Yellow. There are an additional 5 colors available, which may be chosen to lie along the gray axis as described above or may be assigned to other intermediate colors.

In practice, it may happen that the display is capable of rendering colors corresponding to the centers of the edges or faces of the color cube that actually lie outside of the polyhedron in CIElab space that comprises the convex hull constructed from the eight per-pixel palette primary components. In such cases the hue angle and lightness of the intermediate color should be maintained as defined above, but the chroma should be allowed to expand. For example, an intermediate color that is defined as the midpoint of an edge should have hue angle and lightness substantially equal to that of the point equidistant from the two per-pixel palette primary components (i.e., within 10 degrees and 10 dE*, respectively).

Figure 14:
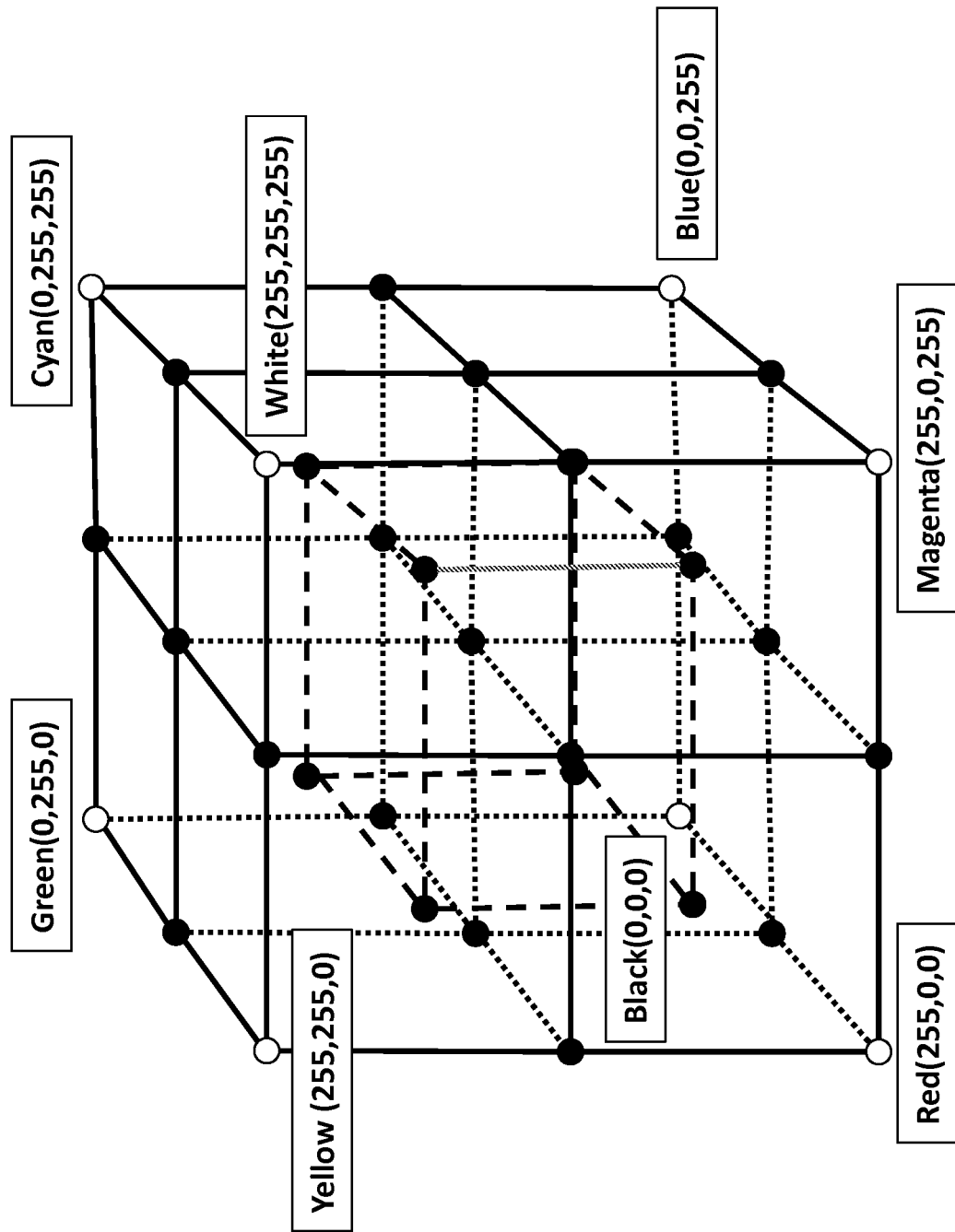

If more than five-bit addressing is possible, additional intermediate colors may be added to the per-pixel palette. An example of an expanded per-pixel palette that requires six-bit addressing is shown in FIG. 14.

Figure 15A:
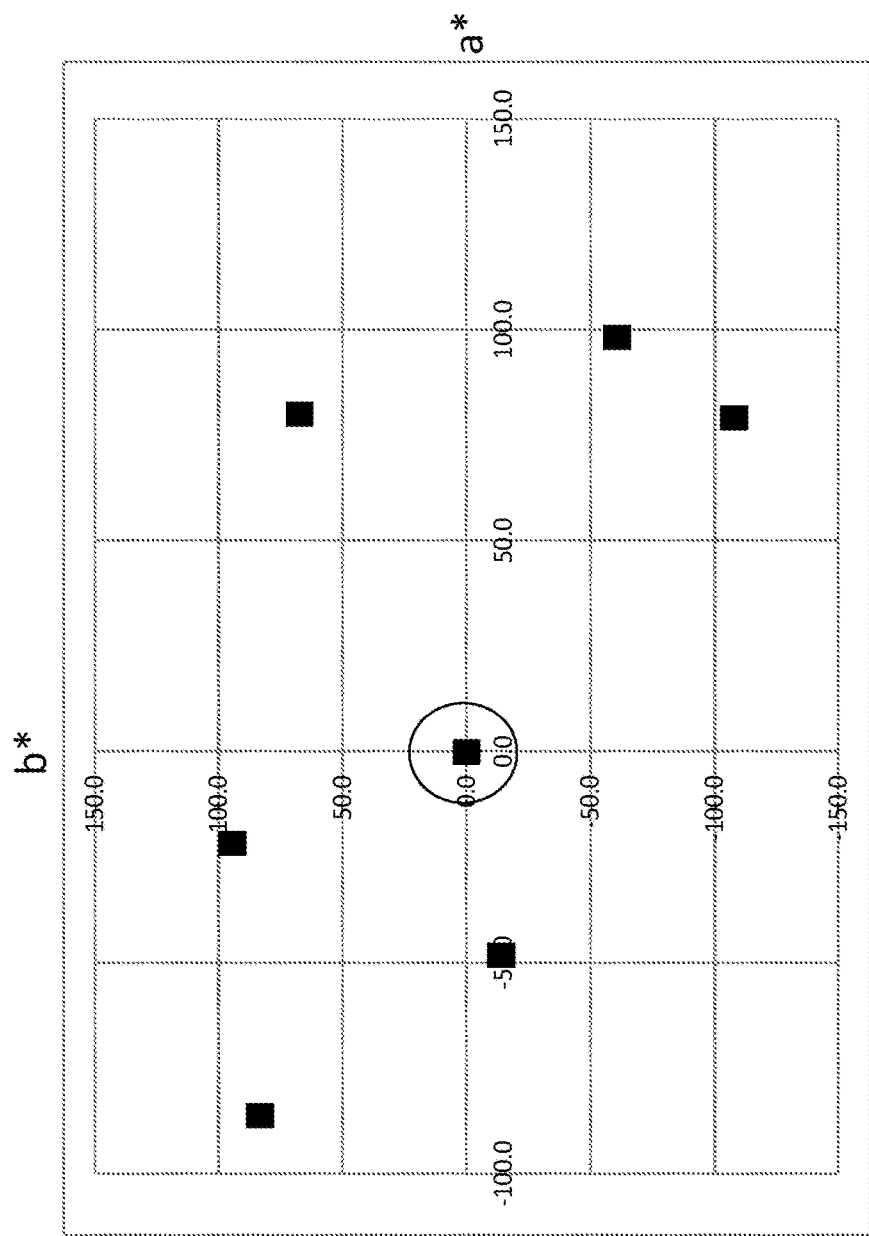
FIGS. 15A, 15B and 15C are schematic drawings depicting colors for a preferred per-pixel palette as defined in the CIELab color space, wherein colors are shown as projected onto the a*/b* plane.
Figure 15B:
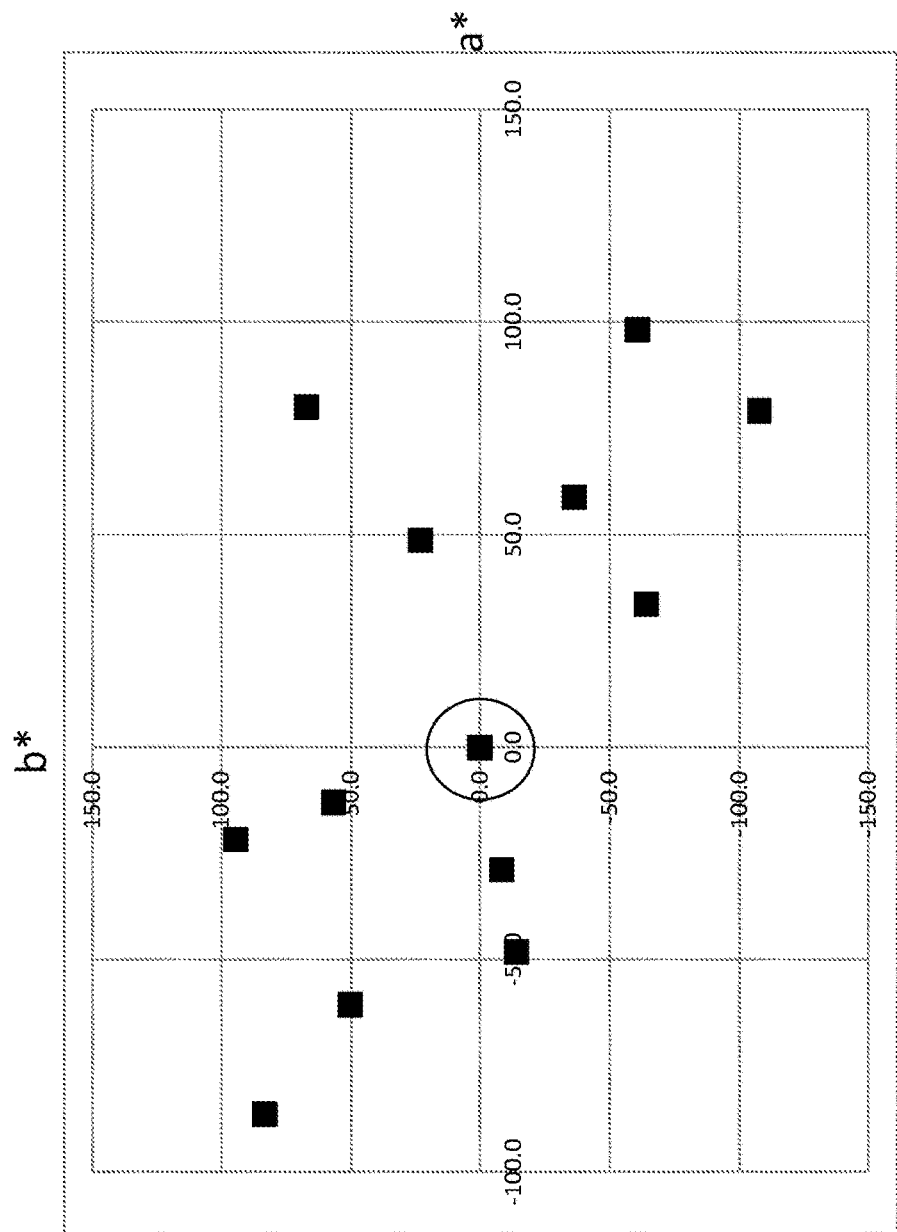
Figure 15C:
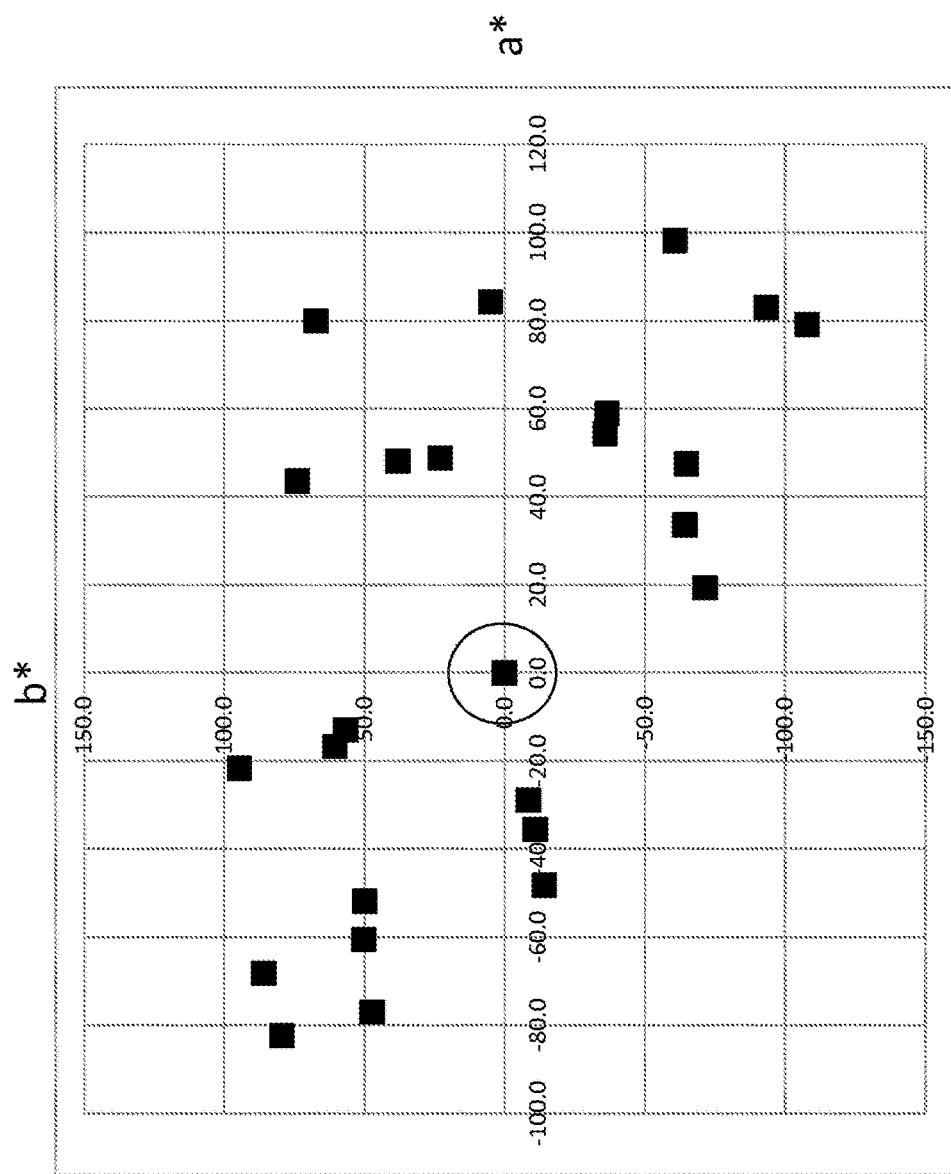

FIGS. 15A-C are schematic drawings depicting colors for a preferred per-pixel palette as defined in the CIELab color space, wherein colors are shown as projected onto the a*/b* plane (a* is the horizontal axis; b* is the vertical axis). The L* axis is perpendicular to the a*/b* plane. The hue angle (h°) is measured from the horizontal axis moving counter-clockwise and is calculated by the following equation:

$$h° = \arctan\left(\frac{b^*}{a^*}\right)$$

In FIG. 15 A, the per-pixel palette is defined by eight (8) colors, which corresponds to the palette described above with reference to FIG. 8 where the source space is sRGB. Of these 8 colors, six (6) colors have a C* value greater than 10 and two (2) colors have a C* value less than 5. The two colors with a C* value less than 5 are preferably white and black. Preferably, the six colors with a C* value greater than 10 are distributed approximately equally in the CIELab color space such that one (1) color is assigned within each of six sectors in hue angle. For example, one color has h° between an angle of 1 and 60 degrees, one color is between 60 degrees and 120 degrees, one color has h° between 120 and 180 degrees, one color has h° between 180 and 240 degrees, one color has h° between 240 and 310 degrees, and one color has h° between 310 and 360 degrees.

In FIG. 15 B, the per-pixel palette is defined by sixteen (16) colors, as described above with reference to FIG. 10 where the source space is sRGB. Of these 16 colors, twelve (12) colors have a C* value greater than 10 and four (4) colors have a C* value less than 5. Preferably, two of the four colors with a C* value less than 5 are white and black and the other two are gray tones distributed between black and white, preferably, distributed with approximately equal spacing in L* between black and white. The 12 colors with a C* value greater than 10 preferably are distributed in the CIELab color space such that 2 colors are assigned within each of six sectors in hue angle. For example, two colors have h° between an angle of 1 and 60 degrees, two colors have h° between 60 degrees and 120 degrees, two colors have h° between 120 and 180 degrees, two colors have h° between 180 and 240 degrees, two colors have h° between 240 and 310 degrees, and two colors have h° between 310 and 360 degrees. The pairs of colors in each segment differ from each other in L* (for example, a lighter and a darker red are provided, as discussed above).

In FIG. 15 C, the per-pixel palette is defined by thirty-two (32) colors, as was described above with reference to FIG. 13 where the source space is sRGB. Of these 32 colors, twenty-four (24) colors have a C* value greater than 10 and eight (8) colors have a C* value less than 5. Preferably, two of the eight colors with a C* value less than 5 are white and black and the other six are distributed between black and white, preferably, distributed with approximately equal spacing in L* between black and white. The 24 colors with a C* value greater than 10 preferably are distributed in the CIELab color space such that all colors are assigned within each of seven sectors in hue angle. For example, three colors have h° between an angle of 15 and 45 degrees, one color has h° between 45 degrees and 75 degrees, three colors have h° between 75 and 110 degrees, five colors have h° between 110 and 180 degrees, three colors have h° between 180 and 250 degrees, eight colors have h° between 250 and 345 degrees and one color has h° between 345 and 15 degrees in a sector that includes h°=360°.

In the present invention, then, an image is rendered on a reflective display by dithering between the per-pixel palette colors. Colors in the rendered image that correspond to the per-pixel palette colors may be rendered without dithering. Therefore, when the display is instructed to display one of the per-pixel palette colors over an extended area of many more than one pixel, that entire area will be of the per-pixel-palette color without any pixel of another color. However, in a complex image with highly diverse colors (i.e., second color set), an image pixel may not be assigned its per-pixel palette color (i.e., first color set) because of errors introduced by the dithering algorithm needed to render other colors in neighboring pixels.

The invention claimed is:
1. An electrophoretic display comprising a plurality of pixels for generating a color image, each pixel capable of rendering no less than 8 colors and no more than 16 colors, wherein the 16 colors are: red, green, blue, cyan, magenta, yellow, white, black, dark yellow, dark magenta, dark cyan, light red, light green, light blue, light gray and dark gray, wherein the colors red, green and blue each have an optical density measurable at three wavelengths, 650 nm, 550 nm, and 450 nm, wherein:
  the optical density of the color red, when measured at 650 nm:
    is at least 0.2 OD lower than the average of its OD when measured 550 nm and 450 nm,
    and is at least 0.1 OD lower than its OD when measured at either 550 nm or 450 nm;
  the optical density of the color green when measured at 550 nm:
    is at least 0.2 OD lower than the average of its OD when measured at 650 nm and 450 nm,
    and is at least 0.1 OD lower than its OD when measured at either 650 nm or 450 nm; and
  the optical density of the color blue when measured at 450 nm:
    is at least 0.2 OD lower than the average of its OD when measured at 650 nm and 550 nm,
    and is at least 0.1 OD lower than its OD when measured at either 650 nm or 550 nm.
2. The electrophoretic display of claim 1, wherein the colors cyan, magenta and yellow each have an optical density measurable at three wavelengths, 650 nm, 550 nm, and 450 nm, wherein:

the optical density of the color cyan, when measured at 650 nm:
- is at least 0.2 OD higher than the average of its OD when measured 550 nm and 450 nm,
- and is at least 0.1 OD higher than its OD when measured at either 550 nm or 450 nm;

the optical density of the color magenta when measured at 550 nm:
- is at least 0.2 OD higher than the average of its OD when measured at 650 nm and 450 nm,
- and is at least 0.1 OD higher than its OD when measured at either 650 nm or 450 nm; and the optical density of the color yellow when measured at 450 nm:
- is at least 0.2 OD higher than the average of its OD when measured at 650 nm and 550 nm,
- and is at least 0.1 OD higher than its OD when measured at either 650 nm or 550 nm.

3. The electrophoretic display of claim 2, wherein the colors black and white each have an optical density measurable at three wavelengths, 650 nm, 550 nm, and 450 nm, wherein:
- the optical densities of the color black, when measured at 650 nm, 550 nm and 450 nm do not differ by more than 0.2 OD; and
- the optical densities of the color white when measured at 650 nm, 550 nm and 450 nm do not differ by more than 0.2 OD.

4. The electrophoretic display of claim 3, wherein the colors light red, light green and light blue each have an optical density measurable at three wavelengths, 650 nm, 550 nm, and 450 nm, wherein:
- the optical density of the color light red, when measured at 650 nm, is at least 0.1 OD lower than the optical density of the color red when measured at 650 nm;
- the optical density of the color light green, when measured at 550 nm is at least 0.1 OD lower than the optical density of the color green when measured at 550 nm; and
- the optical density of the color light blue, when measured at 450 nm are at least 0.1 OD lower than the optical densities of the color blue when measured at 650 nm, 550 nm and 450 nm, respectively.

5. The electrophoretic display of claim 4, wherein the colors dark cyan, dark magenta and dark yellow each have an optical density measurable at three wavelengths, 650 nm, 550 nm, and 450 nm, wherein:
- the optical density of the color dark cyan, when measured at 650 nm, is at least 0.1 OD higher than the optical density of the color cyan when measured at 650 nm;
- the optical density of the color dark magenta, when measured at 550 nm, is at least 0.1 OD higher than the optical density of the color magenta when measured at 550 nm; and
- the optical density of the color dark yellow, when measured at 450 nm, is at least 0.1 OD higher than the optical density of the color yellow when measured at 450 nm.

\* \* \* \* \*